United States Patent
Ishimoto

(10) Patent No.: US 8,307,349 B2
(45) Date of Patent: Nov. 6, 2012

(54) METHODS, SYSTEMS, AND COMPUTER PROGRAM PRODUCTS FOR INTERNATIONALIZING USER INTERFACE CONTROL LAYOUTS

(75) Inventor: Kenya Ishimoto, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 1091 days.

(21) Appl. No.: 12/023,094

(22) Filed: Jan. 31, 2008

(65) Prior Publication Data

US 2009/0199165 A1 Aug. 6, 2009

(51) Int. Cl.
G06F 9/45 (2006.01)
G06F 9/44 (2006.01)
G06F 17/28 (2006.01)
G06F 17/20 (2006.01)

(52) U.S. Cl. .......... 717/136; 717/125; 704/2; 704/8

(58) Field of Classification Search .......... None
See application file for complete search history.

(56) References Cited

U.S. PATENT DOCUMENTS

| | | | | |
|---|---|---|---|---|
| 5,664,206 A * | 9/1997 | Murow et al. | | 704/8 |
| 5,678,039 A * | 10/1997 | Hinks et al. | | 715/202 |
| 5,974,372 A * | 10/1999 | Barnes et al. | | 704/8 |
| 6,219,632 B1 * | 4/2001 | Schumacher et al. | | 704/2 |
| 6,425,123 B1 * | 7/2002 | Rojas et al. | | 717/136 |
| 6,496,793 B1 * | 12/2002 | Veditz et al. | | 704/8 |
| 6,507,812 B1 * | 1/2003 | Meade et al. | | 704/8 |
| 6,532,442 B1 * | 3/2003 | Schumacher et al. | | 704/2 |
| 6,567,973 B1 * | 5/2003 | Yamamoto et al. | | 717/136 |
| 6,735,759 B1 * | 5/2004 | Yamamoto et al. | | 717/136 |
| 7,024,365 B1 * | 4/2006 | Koff et al. | | 704/270.1 |
| 7,103,875 B1 * | 9/2006 | Kaneko et al. | | 717/125 |
| 7,389,223 B2 * | 6/2008 | Atkin et al. | | 717/125 |
| 7,581,208 B2 * | 8/2009 | Aoyama et al. | | 717/125 |
| 7,788,648 B2 * | 8/2010 | Bossom et al. | | 717/136 |
| 2003/0212982 A1 * | 11/2003 | Brooks et al. | | 717/100 |
| 2004/0122652 A1 * | 6/2004 | Andrews et al. | | 704/2 |
| 2005/0050526 A1 * | 3/2005 | Dahne-Steuber et al. | | 717/136 |

(Continued)

FOREIGN PATENT DOCUMENTS

JP 2001125794 A 11/2001

OTHER PUBLICATIONS

Brian Beck et al., Java Internationalization Roadmap, 2000, [Retrieved on May 7, 2012]. Retrieved from the internet: <URL: http://unicode.org/iuc/iuc16/b17/paper.pdf> 14 Pages (1-14).*

(Continued)

*Primary Examiner* — Don Wong
*Assistant Examiner* — Anibal Rivera
(74) *Attorney, Agent, or Firm* — Cantor Colburn LLP; Ingrid Foerster

(57) ABSTRACT

Methods, systems, and computer program products internationalize a user interface (UI) control layout for an application by extracting a translatable text resource comprising a pattern of a message for performing the control layout from a source code of the application. Language information is received that is indicative of one or more languages for the UI control layout. Based upon the received language information, the pattern is constructed and dynamically laid out at run time for graphical presentation to one or more users. The graphical presentation is used to implement the UI control layout in accordance with the one or more languages.

21 Claims, 31 Drawing Sheets

U.S. PATENT DOCUMENTS

| | | | |
|---|---|---|---|
| 2005/0066315 A1* | 3/2005 | Nguyen et al. | 717/136 |
| 2006/0080082 A1* | 4/2006 | Ravindra et al. | 704/8 |
| 2006/0174196 A1* | 8/2006 | Zhang et al. | 715/523 |
| 2006/0200766 A1* | 9/2006 | Lakritz | 715/536 |
| 2006/0248071 A1* | 11/2006 | Campbell et al. | 707/5 |
| 2007/0083855 A1* | 4/2007 | Patel et al. | 717/136 |
| 2007/0179775 A1* | 8/2007 | Bauman et al. | 704/8 |
| 2008/0066058 A1* | 3/2008 | Aoyama et al. | 717/125 |

OTHER PUBLICATIONS

Sun Microsystem et al., Sun Software Product Internationalization Taxonomy, 2001, [Retrieved on May 7, 2012]. Retrieved from the internet: <URL: http://developers.sun.com/dev/gadc/des_dev/i18ntaxonomy/i18n_taxonomy.pdf> 115 Pages (1-115).*

* cited by examiner

NESTED INPUT LAYOUT (BETTER TRANSLATION INCLUDE LAYOUT CHANGE)

EXAMPLE: LOTUS NOTES v7

FIG. 13B

UI CREATION BY EXISTING METHOD (1/4)
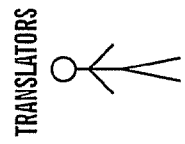
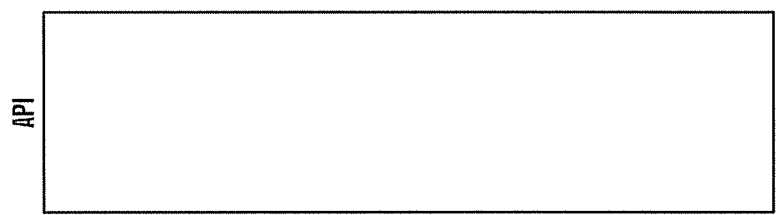
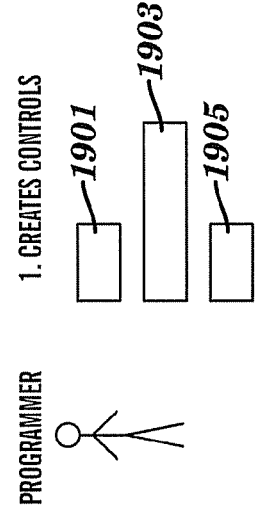
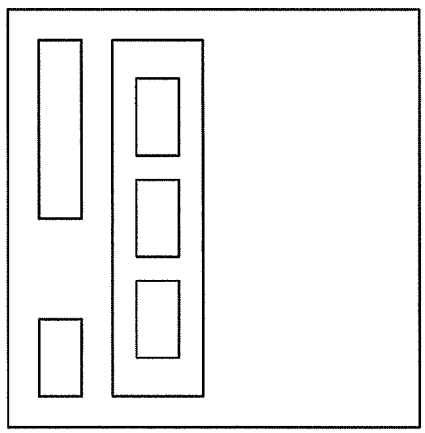
FIG. 19
PRIOR ART

METHODS, SYSTEMS, AND COMPUTER PROGRAM PRODUCTS FOR INTERNATIONALIZING USER INTERFACE CONTROL LAYOUTS

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

The present invention generally relates to user interfaces, and more particularly, to user interfaces which provide internationalization of applications such as Java-based application development projects.

2. Description of Background

In order to enable user interface (UI) resources to be translated into a plurality of different languages, current techniques for internationalized application development utilize processes in which the resources to be translated are separated from a source code and are translated into each language by a translator other than the programmer. The translated resources are dynamically bound according to a language environment at run time, and then displayed on a graphical user interface. These techniques are necessary and effective in development on a substantially large scale, but the degree of freedom for laying out UI controls (software components constituting a UI) is constrained due to the necessity of separating the resources to be translated. A programmer must be careful in order to ensure that a layout of UI controls is independent of the structure of each language. If the programmer considers a user's ease of understanding and formulates a layout such that a sentence in a particular language is constructed with a plurality of UI controls, then a problem may arise in that a separated resource to be translated cannot be translated into a language of a different structure or the translation result is displayed as a wrong sentence at run time. Accordingly, a need may arise to correct the design and source code at a later stage in product development.

For a single text message, an application program interface (API) exists in Java™ for converting elements embedded in a message pattern character string into one character string by formatting the elements for a single text message. API is utilized as a method for internationalization. Translators translate only this pattern string into different languages. At run time, a pattern according to an execution environment is selected and elements to be bound are delivered to API to be converted into a single character string.

Example One

A pattern character string at development time (English):
"Finished processing {0} of {1} pages."
A character string obtained as a result of formatting performed by using API and connecting with two numeric variables at run time:
"Finished 3 of 12 pages."

Example Two

A pattern character string translated into Japanese:
"{1}ページ中 {0}ページの 処理完了。"

A character string obtained as a result of formatting on the basis of a pattern in Japanese at run time:
"12ページ中 3ページの 処理完了。"

The foregoing technique enables translation of a message dynamically changing at run time by extracting only a translation pattern from the message. This pattern is part of API. Therefore a translator translates a message while taking notice that the element designation "{n}" in a resource to be translated will be replaced at run time.

Existing techniques for realizing a language-dependent layout of UI controls and translating this layout utilize the following procedure. A programmer prepares, for each language, a source code for layout and a resource to be translated. The programmer translates the resource by him/herself or makes necessary changes in the source code by closely communicating with translators. This may be possible in the case of a small-scale application development in which translation target languages are limited, but increases the resulting development, translation and maintenance costs. Also, it is difficult to implement this procedure for large-scale application development requiring translation into many languages.

In the context of developing large-scale internationalized applications, difficulties arise in realizing a UI layout constructed in such a manner that an array of a plurality of UI controls constitutes one message as a whole on a UI of the application. It is difficult to translate this plurality of UI controls into other languages. Accordingly, what is needed is an improved technique for addressing the aforementioned difficulties.

SUMMARY OF THE INVENTION

Methods for internationalizing a user interface (UI) control layout for an application extract a translatable text resource comprising a pattern of a message for performing the control layout from a source code of the application. Language information is received that is indicative of one or more languages for the UI control layout. Based upon the received language information, the pattern is constructed and dynamically laid out at run time for graphical presentation to one or more users. The graphical presentation is used to implement the UI control layout in accordance with the one or more languages.

System and computer program products corresponding to the above-summarized methods are also described and claimed herein. Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 13B illustrates an exemplary Japanese language UI prepared using the procedure of FIG. 11B in accordance with an illustrative embodiment of the invention disclosed herein.

FIGS. 19-22 together comprise a sequential data flow diagram illustrating a prior art method for generating a UI.

The detailed description explains the preferred embodiments of the invention, together with advantages and features, by way of example with reference to the drawings.

DETAILED DESCRIPTION OF THE INVENTION

Figure 1:
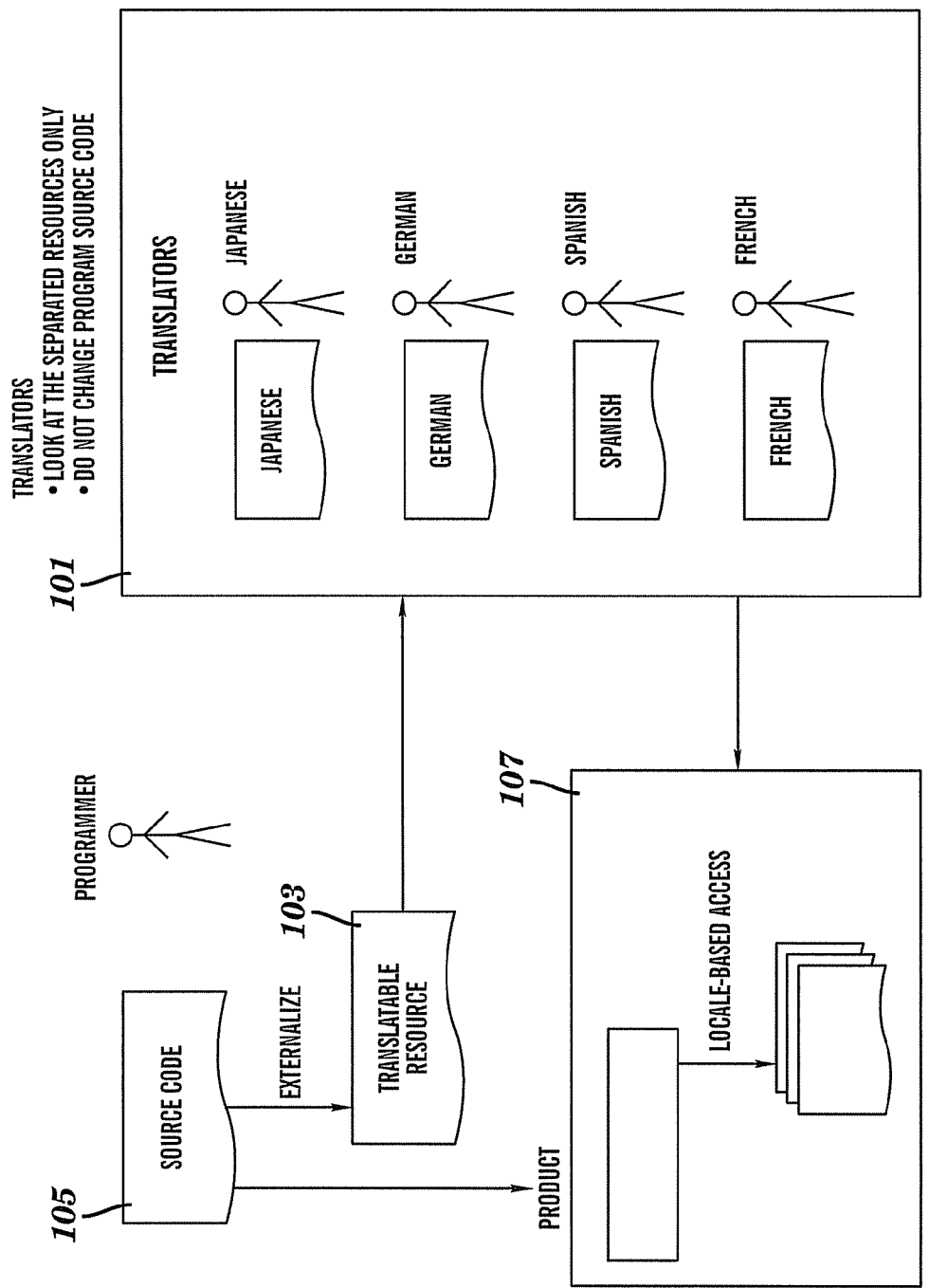
FIG. 1 is a block diagram setting forth an illustrative context for the present invention.

FIG. 1 is a block diagram setting forth an illustrative context for the present invention. A translatable resource 103 is extracted from a source code 105 of an application to be offered as a product 107. The product 107 can be accessed in any of a plurality of different languages, such as Japanese, German, Spanish, and French. The translatable resources 103 are translated by translators 101. The translators 101 look at the extracted translatable resource 103 only, and do not change the program source code 105.

Figure 2:
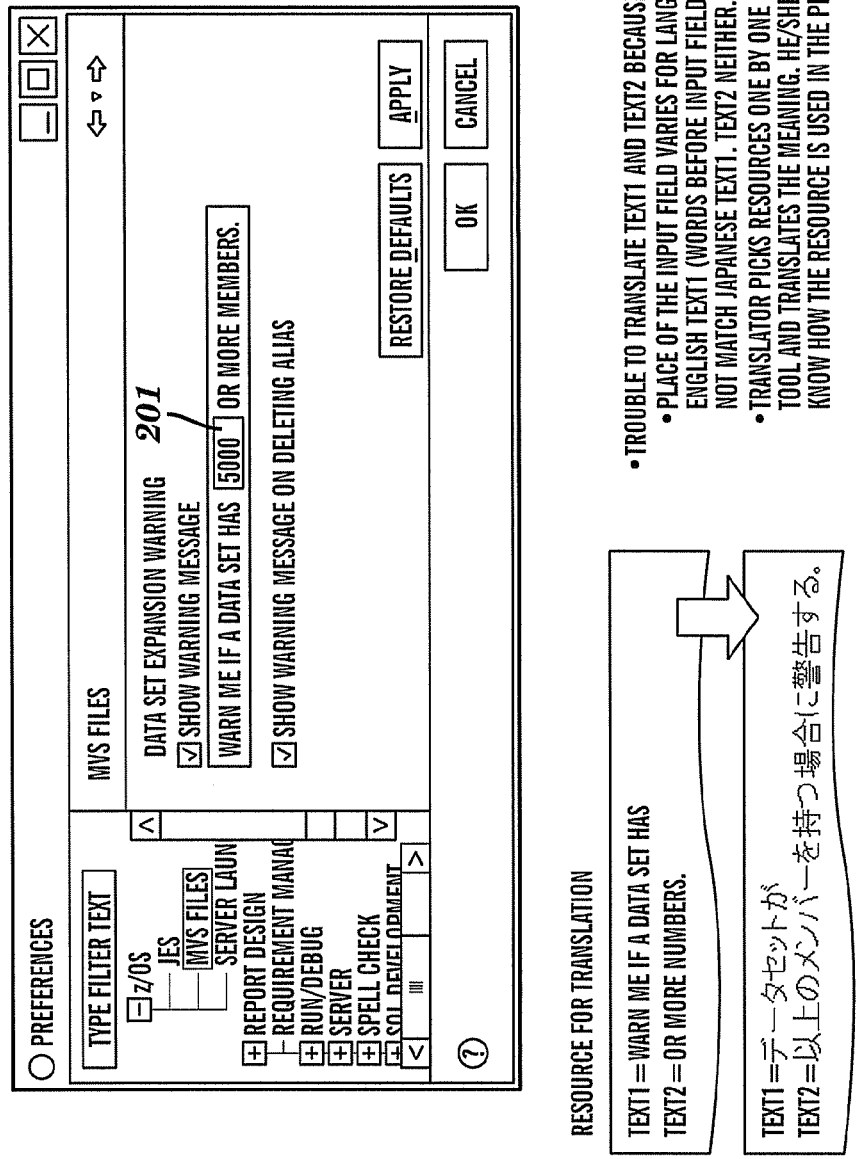
FIGS. 2, 3, and 4 illustrate exemplary prior art user interfaces.
Figure 3:
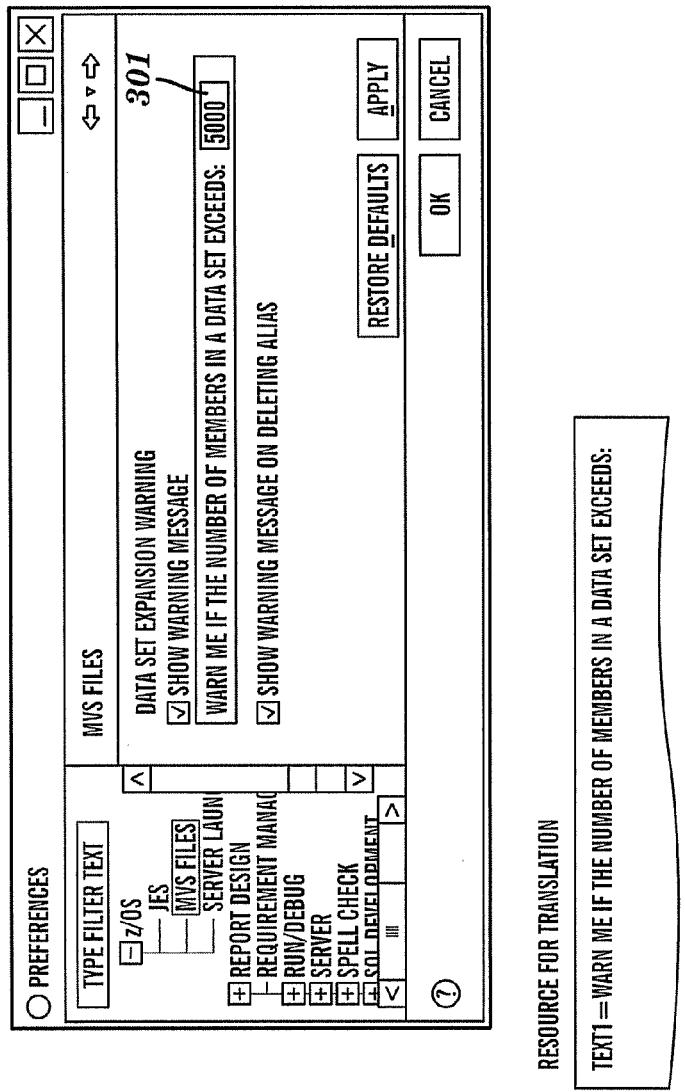
Figure 4:
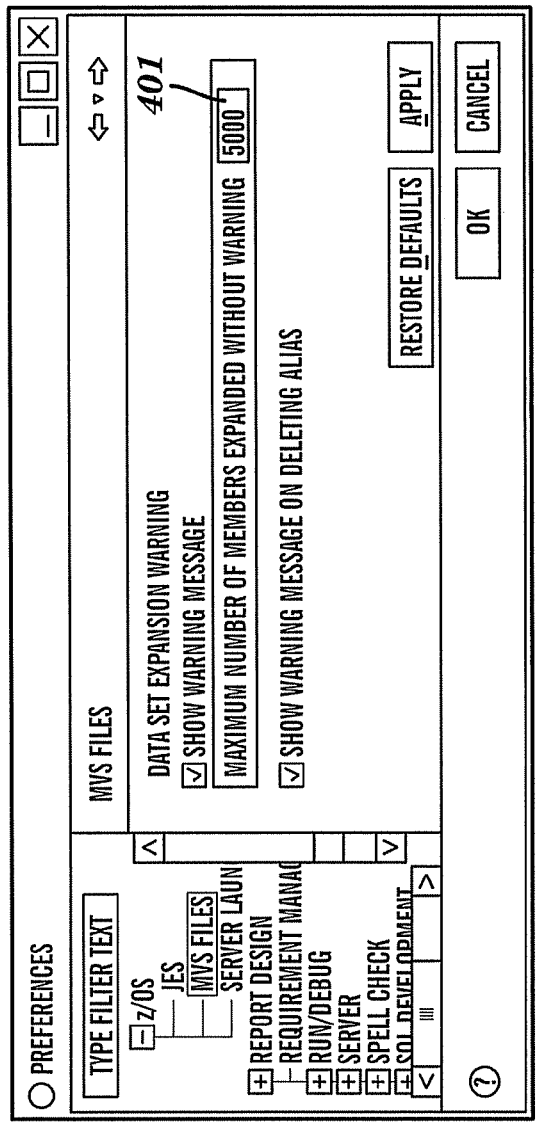

FIGS. 2, 3, and 4 are exemplary prior art user interfaces that illustrate existing constraints on user interface (UI) design. For example, a developer may create an exemplary prior art user interface 200 for use in WebSphere Developer for zSeries (WD/z)™. One desired objective is to display a graphical user interface that indicates "Warn me if a data set has xxx or more members" in each of a plurality of different languages, where xxx represents an input field 201 that contains a positive integer, such as 5000, that is selected or specified or inputted by a user. In other words, an input control represented by input field 201 is situated between a first text label and a second text label. Translation of this phrase causes problems because the correct position of the input field 201 varies for different languages. In English, a first portion of text is required prior to the input field 201 and a second portion of text is required after the input field 201. In Japanese, the portion of text required prior to the input field 201 does not correspond to the first portion of text that would be used in the case of English. Likewise, in Japanese, the portion of text required after the input field 201 does not correspond to the second portion of text that would be used in the case of English. In this prior art setting, a translator picks resources one by one using a tool and translates the meanings. The translator does not know how the resource is used in a particular program.

FIG. 3 illustrates a prior art user interface 300 similar to the user interface 200 of FIG. 2, except for the fact that the developer has moved the input field 201 of FIG. 2 to place it after the label, thus providing an input field 301 (FIG. 3). Thus, the user interface of FIG. 3 has been changed not to have multiple text labels (i.e., a first portion of text and a second portion of text as in FIG. 2), but only a single block of text as such: "Warn me if the number of members in a data set exceeds: xxx" where xxx represents an input field 301 and, in the present example, includes the integer 5000. However, a Japanese translator still needs to know that the input field 301 comes after the single block of text or the text and input field 301 will be translated incorrectly.

FIG. 4 illustrates a prior art user interface similar to that of FIG. 3 where the text has been amended to read "Maximum number of members expanded without warning: xxx", where xxx represents an input field 401 and, in the present example, includes the integer 5000. The text has been amended to avoid or reduce translation errors.

Figure 5:
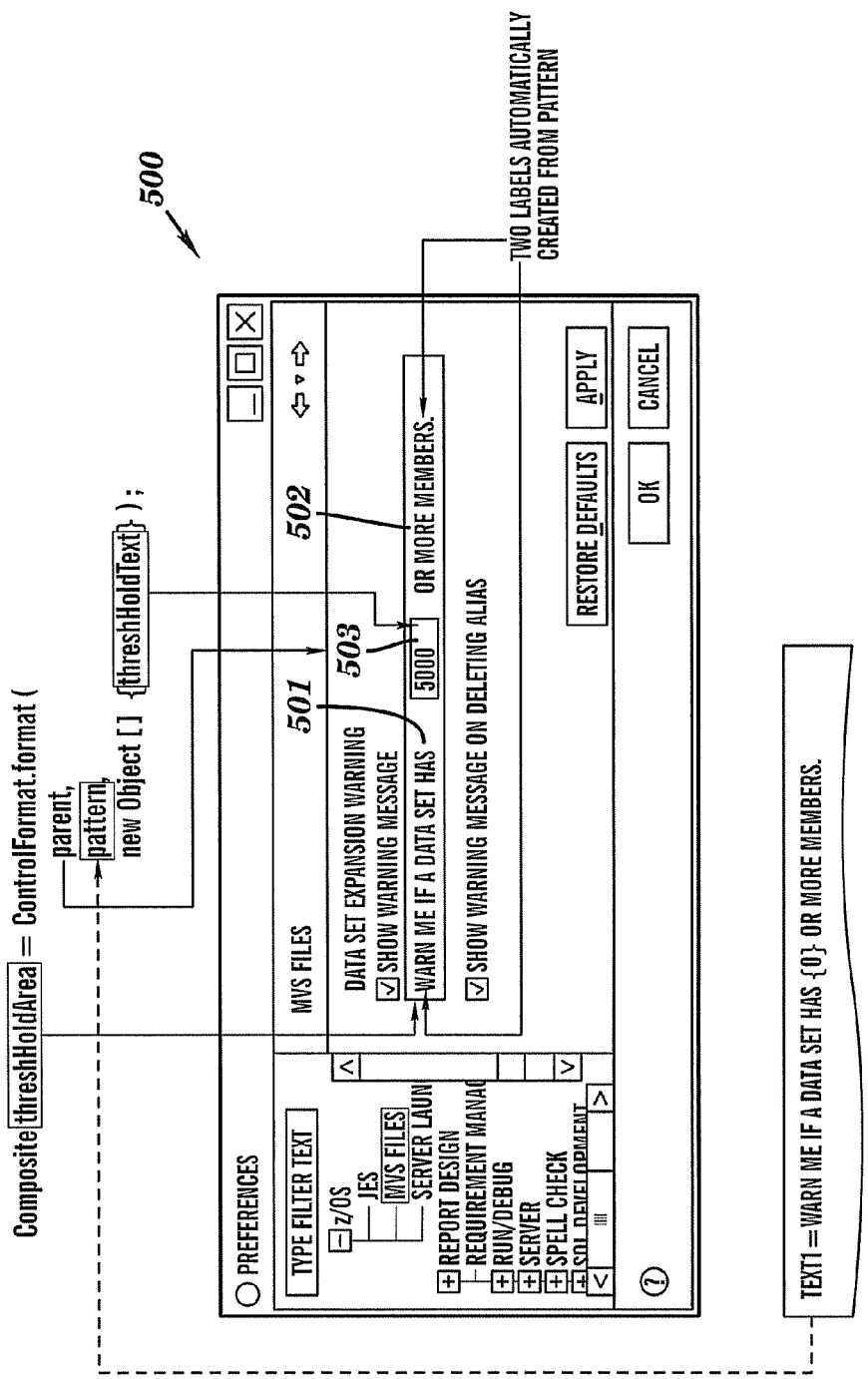
FIG. 5 illustrates an exemplary user interface constructed in accordance with the methods described herein.

FIG. 5 illustrates an exemplary user interface 500 constructed in accordance with the methods described herein. The user interface 500 illustrates an example of application program interface (API) usage. A first label 501 and a second label 502 are automatically created from a pattern. The first label 501 specifies "Warn me if a data set has", and the second label 502 specifies "or more members". A data input field 503 appears between the first label 501 and the second label 502. In the present example, the data input field 503 contains the integer 5000.

Figure 6:
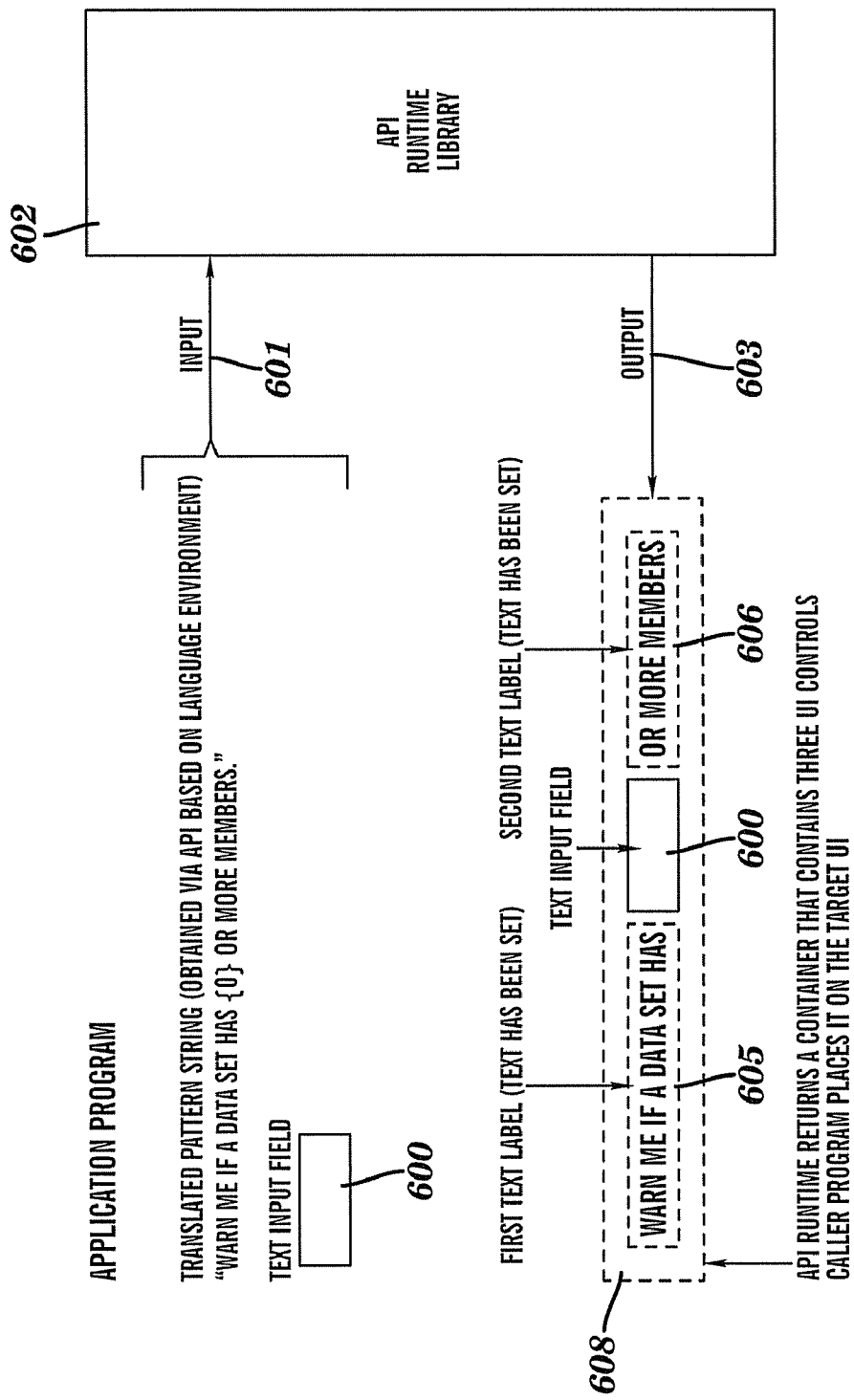
FIG. 6 is a flow diagram illustrating runtime behavior from an application program.

FIG. 6 is a flow diagram illustrating runtime behavior from an application program. A translated pattern string obtained via API based on a language environment constitutes an input 601 to an API runtime library 602. The API runtime library 602 returns an output 603 in the form of a container 608 that, in the present example, includes three UI controls. The container 608 includes a first text label 605, a text input field 600, and a second text label 606. In the present example, the first text label 605 is "Warn me if a data set has", and the second text label 606 is "or more members".

Figure 7:
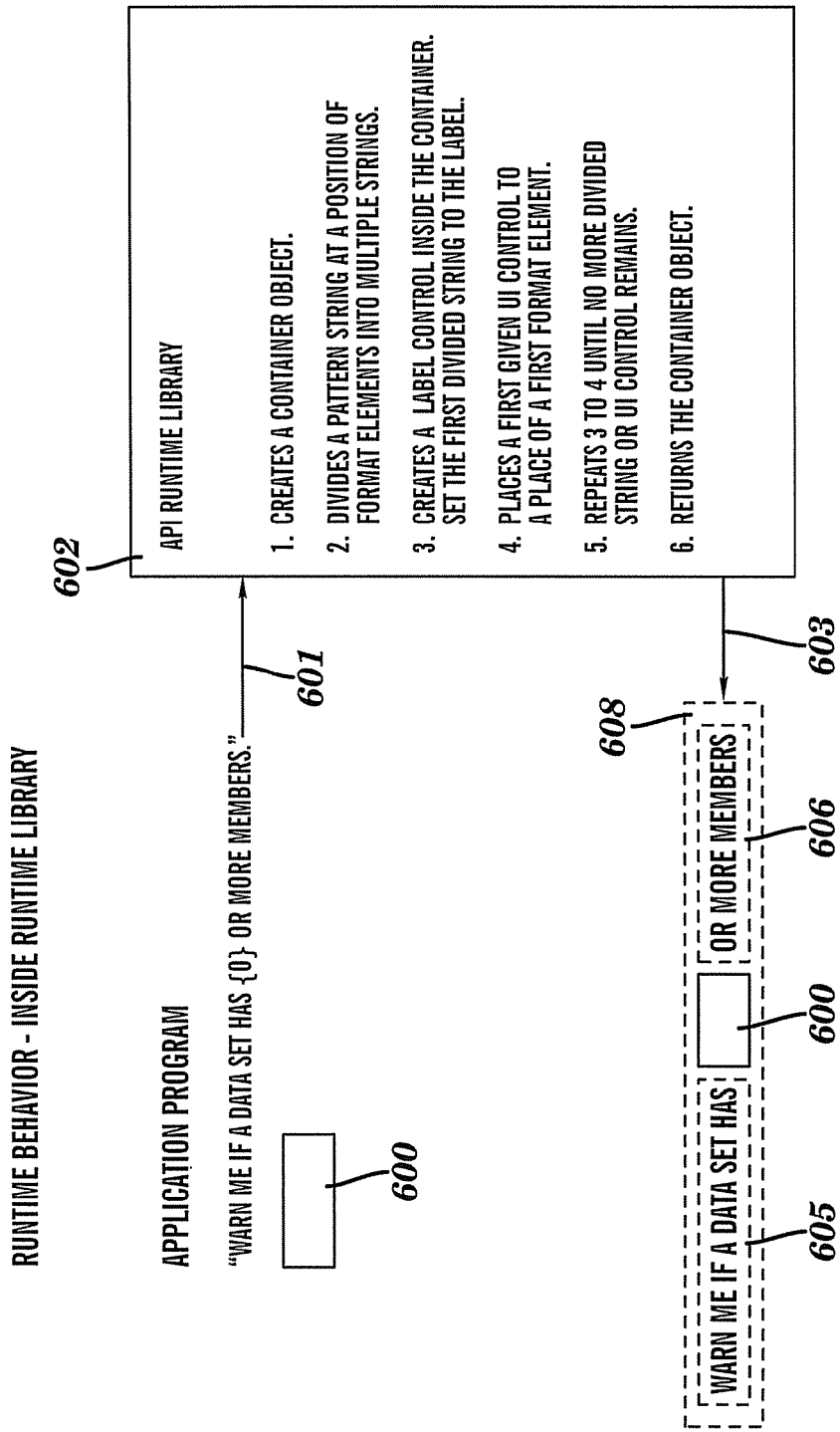
FIG. 7 is a flow diagram illustrating runtime behavior inside a runtime library.

FIG. 7 is a flow diagram illustrating runtime behavior inside the API runtime library 602 of FIG. 6. First, the API runtime library 602 creates a container object for the container 608. The API runtime library 602 then divides a pattern string at one or more positions of format elements into multiple strings including at least a first divided string and a second divided string. A label control is created inside the container 608. The first divided string is set to the label control. A first given UI control is set to a place of a first format element of the format elements. The steps of creating a label control inside the container 608, setting the divided string to the label control, and setting a given UI control to a place of a format element of the format elements, are repeated until no more divided strings or UI controls remain. The container object for container 608 is then returned.

Figure 8:
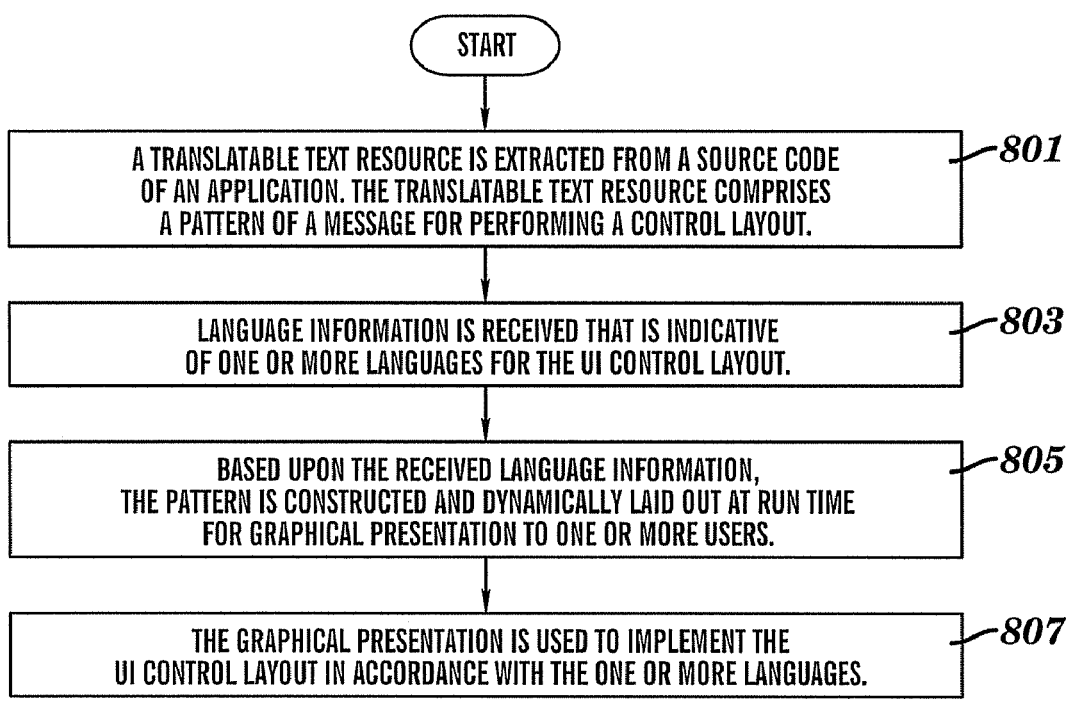
FIG. 8 is a flowchart setting forth a first exemplary method for internationalizing a user interface (UI) control layout.

FIG. 8 is a flowchart setting forth a first method for internationalizing user interface (UI) control layout for an application. The procedure commences at block 801 where a translatable text resource is extracted from a source code of the application. The translatable text resource comprises a pattern of a message for performing the control layout. Next, at block 803, language information is received that is indicative of one or more languages for implementing the UI control layout. For example, it may be desired to provide a first UI control layout in English, and a second UI control layout corresponding to the first UI control layout but in Japanese. At block 805, based upon the received language information, the pattern is constructed and dynamically laid out at run time for graphical presentation to one or more users. The graphical presentation is used to implement the UI control layout in accordance with the one or more languages (block 807).

Figure 9:
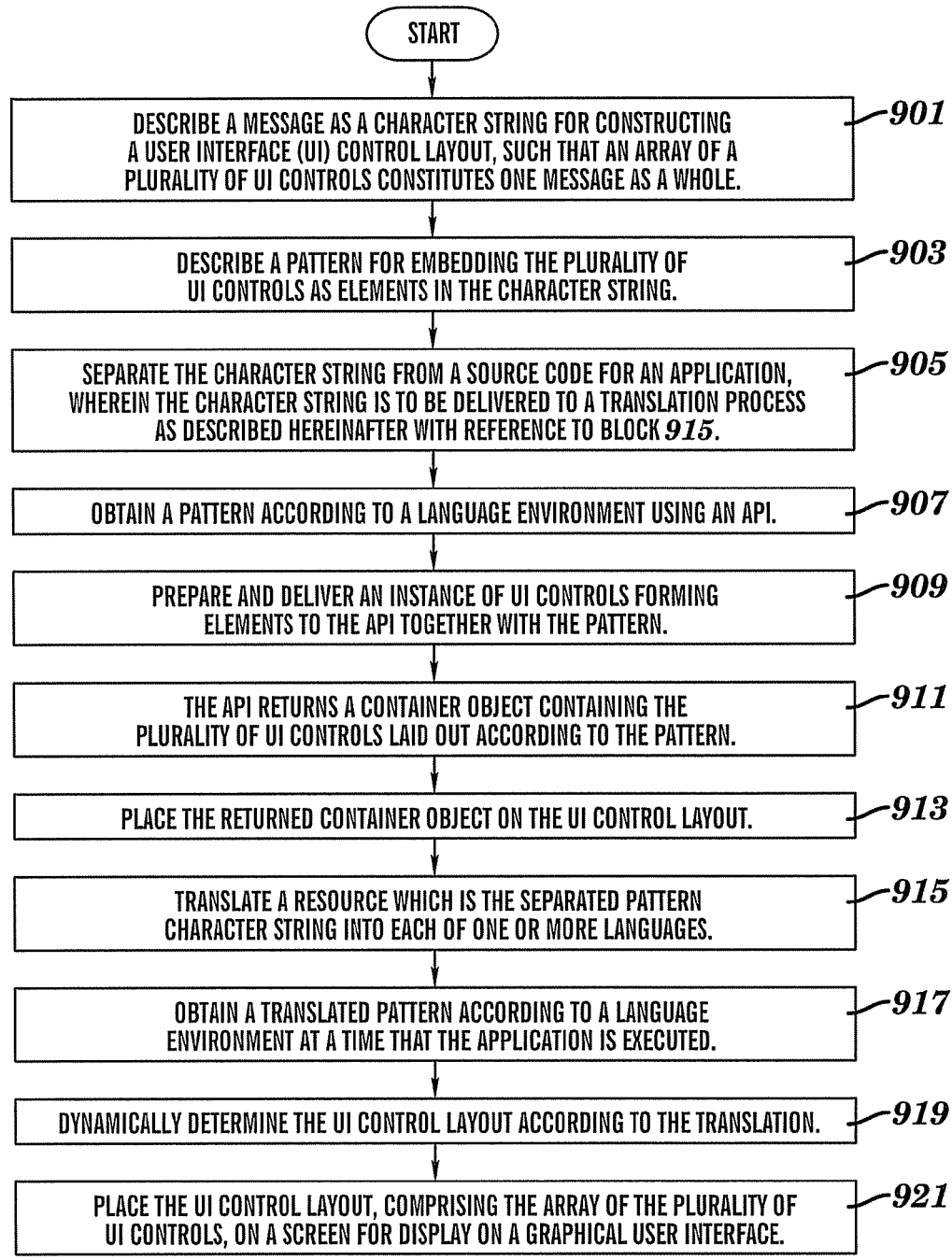
FIG. 9 is a flowchart setting forth a second exemplary method for internationalizing a UI control layout.

FIG. 9 is a flowchart setting forth a second exemplary method for internationalizing a user interface control layout. The second method utilizes an API for generating a plurality of static text labels on the basis of a pattern of a message and dynamically laying out the labels in combination with one or more UI controls of a user application. This API is used to enable a development process and an execution environment as described hereinafter.

1. At Development Time:

In situations where a programmer desires to construct a UI control layout such that an array of a plurality of UI controls constitutes one message as a whole, he or she describes the message as a character string (block 901) and describes a pattern for embedding the plurality of UI controls as elements in the character string (block 903). This character string is separated from a source code for an application (block 905), wherein the character string is to be delivered to a translation process (described hereinafter with reference to block 915).

According to a source code for actually making a UI to be displayed, a pattern according to a language environment is obtained by using an API (block 907), and an instance of UI controls forming elements is prepared and delivered to API together with the pattern (block 909). The API returns a container object containing the plurality of UI controls laid out according to the pattern (block 911). The returned object is placed on the UI control layout (block 913). Block 913 may be performed, for example, by an API call originator. It is not necessary for the programmer to consider the layout in the container.

2. At Translation Time:

At block 915, a resource which is the separated pattern character string is translated into each of one or more languages. Optionally, during translation, designated positions for embedding elements may be changed freely in the message according to the grammatical structure of each of the one or more languages. These one or more languages may be conceptualized as translation target languages. The separated pattern is translatable since it represents a sentence. Translators can treat this resource equally with other resources to be translated. It is not necessary for the translators to know into which UI controls the resource will be actually converted and displayed.

3. At Run Time:

A translated pattern according to a language environment at a time that the application is executed is obtained (block 917). At block 919, the UI control layout is dynamically determined according to the translation of block 915. The UI control layout, comprising the array of the plurality of UI controls, is placed on a screen for display on a graphical user interface (block 921). Thus, the plurality of UI controls form the message according to the language at run time.

Figure 10A:
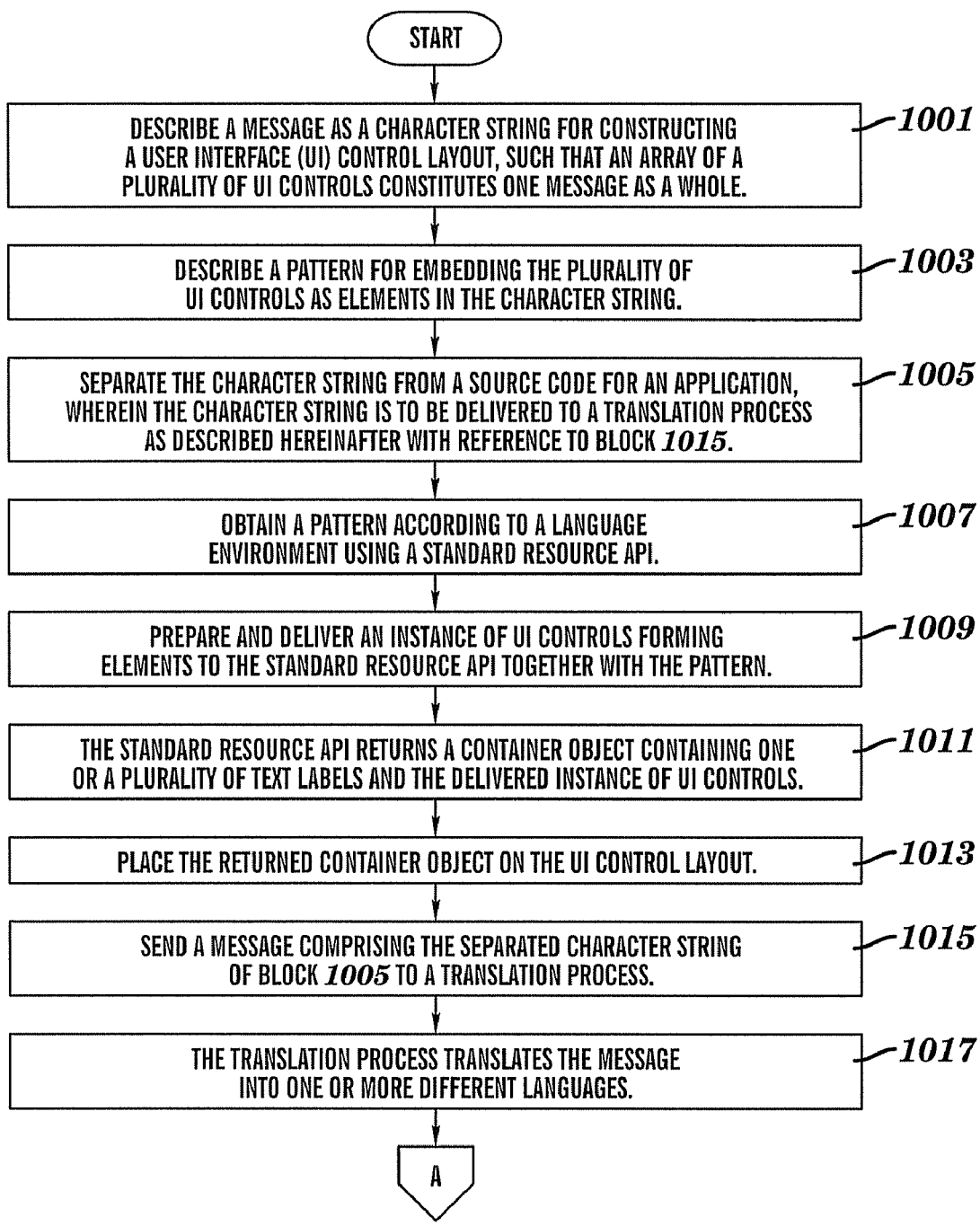
FIGS. 10A and 10B together comprise a flowchart setting forth a third exemplary method for internationalizing a UI control layout.
Figure 10B:
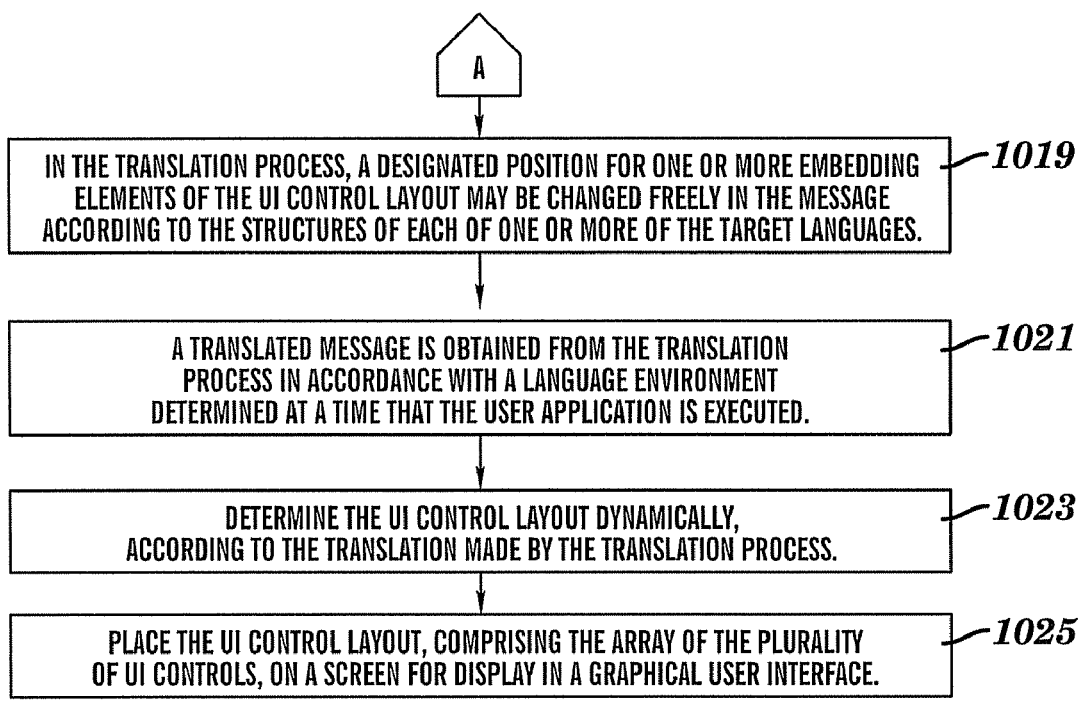

FIGS. 10A and 10B together comprise a flowchart setting forth a third exemplary method for internationalizing a user interface control layout for a user application. The third exemplary method employs an API for generating a plurality of static text labels on the basis of a pattern and returning a container object. The container object includes contents laid out according to the text labels and a runtime library for the API. The API and the library are used at development time and run time, as described below.

1. At Development Time:

In situations where a programmer wants to construct a UI control layout such that an array of a plurality of UI controls constitutes one message as a whole, he or she first describes the message as a character string (block 1001) and then describes a pattern for embedding the plurality of UI controls as elements in the character string (block 1003). This character string is separated from a source code for an application (block 1005), wherein the character string is to be to be delivered to a translation process (described hereinafter with reference to block 1015).

Example

A resource in English to be translated (message pattern):
"Warn me if a data set has {0} or more members."

According to a source code for actually making a UI, a pattern according to a language environment is obtained by using a standard resource API (block 1007). This standard resource API is an API that is used for ordinary resources to be translated. An instance of UI controls forming elements is prepared and delivered to the standard resource API together with the pattern (block 1009). The standard resource API returns a container object containing one or a plurality of text labels and the delivered instance of UI controls (block 1011). The returned container object is placed on the UI control layout (block 1013).

Example

An object for a text input field to be placed in correspondence with the portion {0} in the pattern is generated and delivered to API together with the above-described pattern character string. API returns a container object. The container object is placed on the UI control layout. It is not necessary for the programmer to consider how UI controls such as the text labels and the text input field are actually placed in the container.

2. At Translation Time:

A separated message comprising the separated character string of block 1005 is translatable since it represents a sentence. This message is treated equally with ordinary resources to be translated and is sent to a translation process (block 1015). The translation process translates the message into one or more different target languages (block 1017). Optionally, in the translation process, a designated position for one or more embedding elements of the UI control layout may be changed freely in the message according to the grammatical structure of each of one or more of the target languages (block 1019). In other words, the translation process may, but need not, performed such that a designated position for one or more embedding elements of the UI control layout may be changed freely in the message according to a respective grammatical structure for each of one or more corresponding target languages. It is not necessary for the translation process to know how the message is actually displayed as UI controls.

Example

A translator of a Japanese edition translates the original resource in English, as shown below.

"データセットが {0}個以上のメンバー を持つ場合 ご警告する。"

3. At Run Time

A translated message is obtained from the translation process in accordance with a language environment determined at a time that the user application is executed (block 1021). The UI control layout is dynamically determined according to the translation made by the translation process (block 1023). The UI control layout, comprising the array of the plurality of UI controls, is placed on a screen (block 1025) for display in a graphical user interface. Thus, the plurality of UI controls form the message according to the language at run time.

Example

In the English environment, a runtime library for API prepares a container object, as shown below.

1. A character string "Warn me if a data set has {0} for more members." and one text input field object are delivered to API.
2. A container object for containing the whole contents is prepared.
3. A text label is prepared in the container, "Warn me if a data set has" is set and placed.
4. The text field object delivered from the API call originator is placed in the container.
5. A text label is prepared in the container, "or more members" is set and placed.
6. The container object is returned to the caller.

Example

Steps shown below are performed in the Japanese environment.

1. A character string "データセットが {0}個以上のメンバー を持つ場合 ご警告する。" and one text input field object are delivered to API.
2. A container object for containing the whole contents is prepared.
3. A text label is prepared in the container, "データセットが" is set and placed.
4. The text field object delivered from the API call originator is placed in the container.
5. A text label is prepared in the container, "個以上のメンバーを持つ場合ご警告する。" is set and placed.
6. The container object is returned to the caller.

If there are a plurality of elements to be placed, the above steps 3 and 4 are repeated.

Pursuant to further embodiments of the invention, translation of a single message character string is implemented using the foregoing methods. In the case of implementation with the Java language, translators can perform translation without being conscious of expansion if they comply with the any of the above-described message pattern specifications.

Figure 11A:
FIG. 11A is a flow diagram illustrating a prior art method for internationalizing a UI control layout for a set of nested inputs that results in an incorrect translation.

FIG. 11A is a flow diagram illustrating a prior art method for internationalizing a UI control layout for a set of nested inputs that results in an incorrect Japanese translation. A first set of UI controls 1101 includes an input field 1113 that is either checked or unchecked, as well as a text label specifying "Save automatically". A second set of UI controls 1103 includes an input field 1109 for accepting a number of minutes, such as five, and two text labels: "Save every" and "minutes". The first set of UI controls 1101 and the second set of UI controls 1103 are hierarchical, and may be combined to provide a more compact UI.

A third set of UI controls 1105 represents a combination of the first and second sets of UI controls 1101, 1103, respectively. The third set of UI controls 1105 includes an input field 1111 that is either checked or unchecked, the input field 1109, a first text label specifying "AutoSave every", and a second text label specifying "minutes". Unfortunately, when the third set of UI controls 1105 is translated into Japanese to provide a Japanese set of UI controls 1107, an incorrect translation results. In order to avoid this translation error, a prior art work-around is provided in the form of a revised set of UI controls 1115. The revised set of UI controls places a first text label "Save interval:" immediately preceding the time input of input field 1109, and a second text label "minutes" is provided immediately following input field 1109 to form the revised set of UI controls 1115. Thus, FIG. 11A illustrates the problems that may arise when prior art techniques are called upon to handle nested (combined) input layout.

Figure 11B:
FIG. 11B is a flow diagram illustrating an exemplary method for internationalizing a UI control layout for a set of nested inputs in accordance with an illustrative embodiment of the invention disclosed herein.

FIG. 11B is a flow diagram illustrating an exemplary method for internationalizing a UI control layout for a set of nested inputs in accordance with an illustrative embodiment of the invention disclosed herein. An enhanced set of UI controls 1116 is provided by placing the input field 1111 (checked or unchecked) to the left of the input field 1109 (a numerical input), with the input field 1109 being followed by a Japanese text label. In this manner, hierarchical input user interfaces may be combined into an enhanced user interface that is compact and simple. The enhanced user interface, in the form of UI controls 1116, provides a relationship of controls that is much clearer and more intuitive than separated sets of user interfaces.

Figure 12:
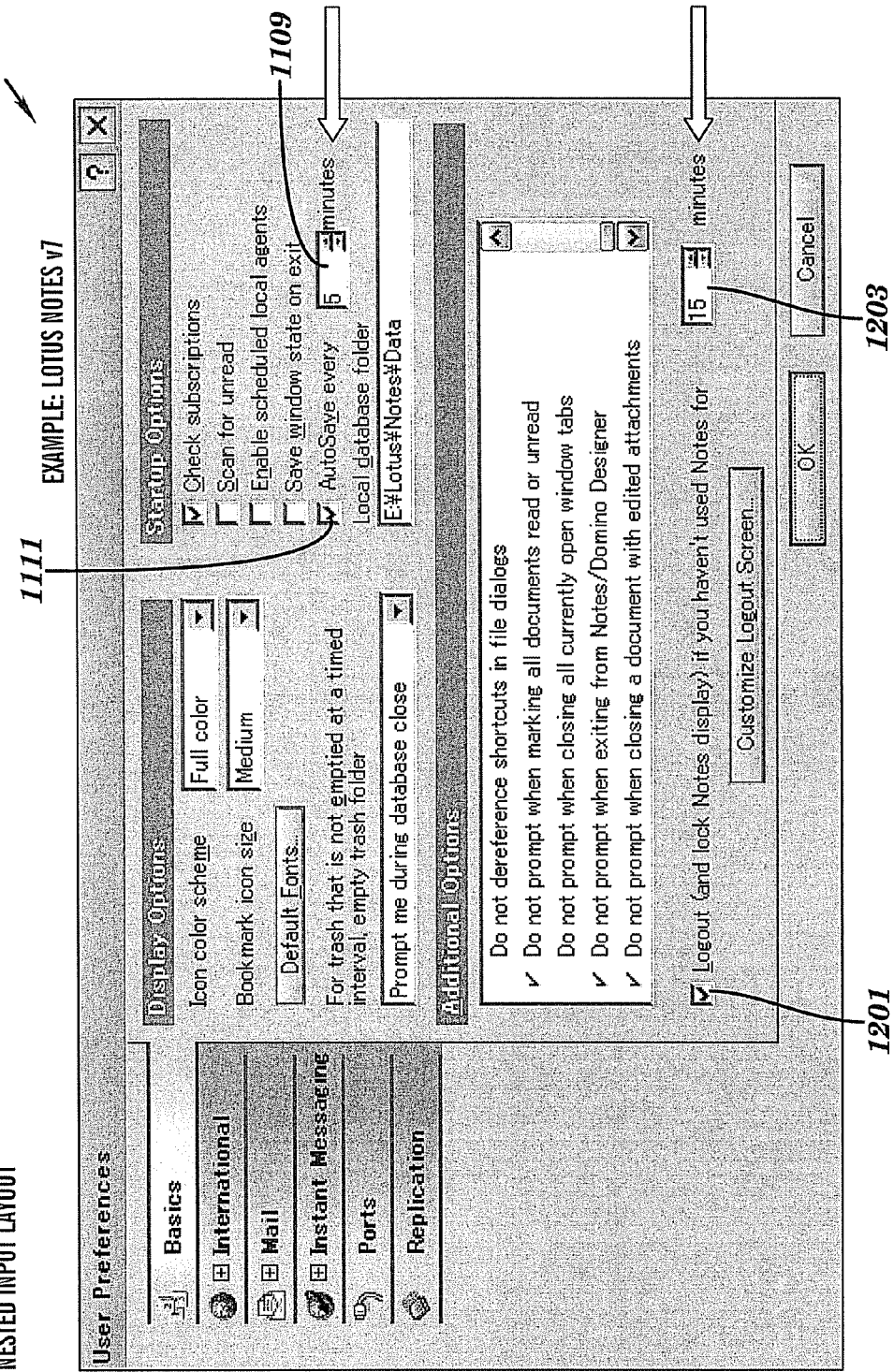
FIG. 12 illustrates a prior art English language UI prepared using the procedure of FIG. 11A.

FIG. 12 illustrates a prior art English language UI prepared using the procedure of FIG. 11A. UI 1200 includes the input field 1111 and the input field 1109 arranged as shown with respect to the enhanced set of UI controls 1119 (FIG. 11). UI 1200 also includes an input field 1201 that is either checked or unchecked, and an input field 1203 that accepts a number of minutes.

Figure 13A:
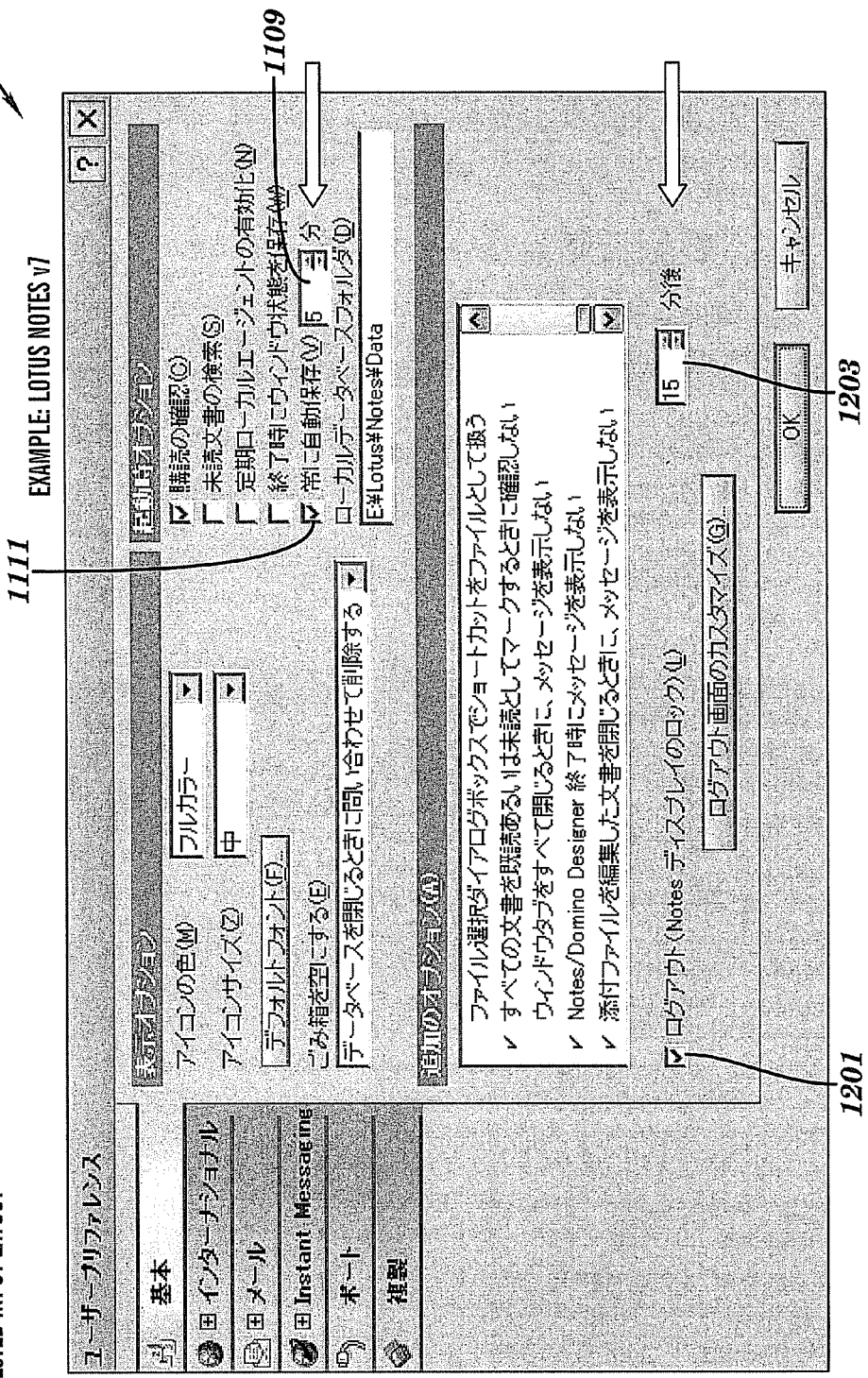
FIG. 13A illustrates a prior art Japanese language UI prepared using the procedure of FIG. 11A.

FIG. 13A illustrates a prior art Japanese language UI prepared using the procedure of FIG. 11A. More specifically, FIG. 13A illustrates a page of Lotus Notes that has been translated incorrectly into Japanese. UI 1300 includes the input field 1111 and the input field 1109 arranged as shown with respect to the enhanced set of UI controls 1119 (FIG. 11). UI 1300 also includes the input field 1201 (FIGS. 12 and 13A) that is either checked or unchecked, and the input field 1203 that accepts a number of minutes.

FIG. 13B illustrates an exemplary Japanese language UI prepared using the procedure of FIG. 11B in accordance with an illustrative embodiment of the invention disclosed herein. More specifically, FIG. 13B illustrates a page of Lotus Notes that has been translated correctly into Japanese. UI 1301 includes the input field 1111 (checked or unchecked) to the left of the input field 1109 (numerical value). To the right of the input field 1109 is a Japanese text label. UI 1301 also includes the input field 1201 (checked or unchecked) to the left of the input field 1203 (numerical value). To the right of the input field 1203 is a Japanese text label.

Figure 14:
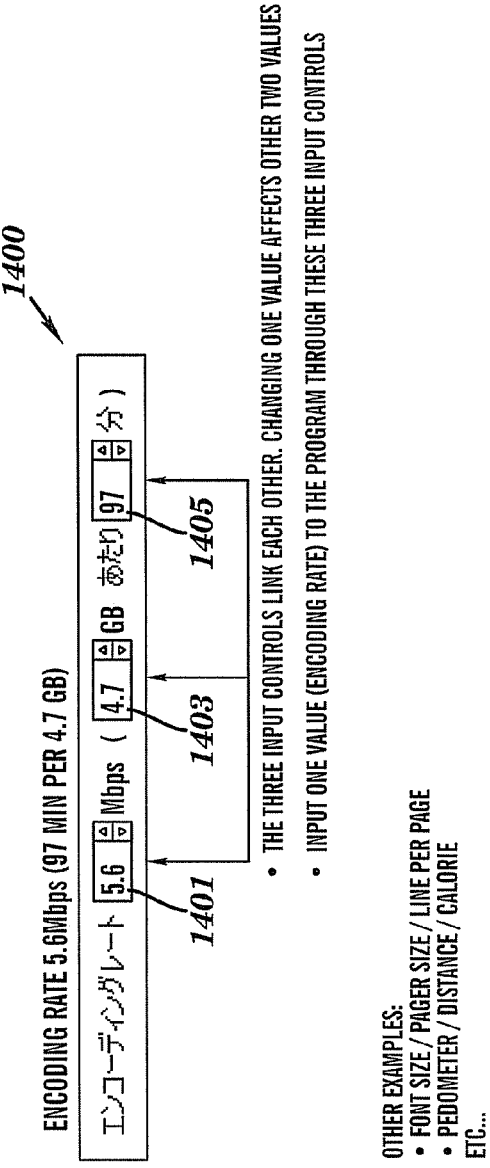
FIG. 14 illustrates a UI that provides a group of interlinked UI controls.

FIG. 14 illustrates a group of interlinked UI controls 1400 including a first input field 1401, a second input field 1403, and a third input field 1405. By way of example, the first, second, and third input fields 1401, 1402, 1403 may be used to set an encoding rate to a hard disk video recorder. The first input field 1401 accepts a numeric value representing Mbps, the second input field 1403 accepts a numeric value representing GBs, and the third input field 1405 accepts a numeric value representing minutes.

The group of interlinked UI controls 1400 obtains a single value from a user through the use of multiple input controls comprising any of the first, second, or third input fields 1401, 1402, 1403. The multiple input controls help a user to determine an appropriate input value. Changing the value in any of the input fields 1401, 1402, 1403 automatically changes the values in the remaining input fields 1401, 1402, 1403. Together, the input fields 1401, 1402, 1403 are used to send a single value, in this example representing an encoding rate, to a user application. The group of interlinked UI controls 1400 are provided using any of the procedures described previously with reference to FIGS. 8, 9, 10A and 10B.

Figure 15:
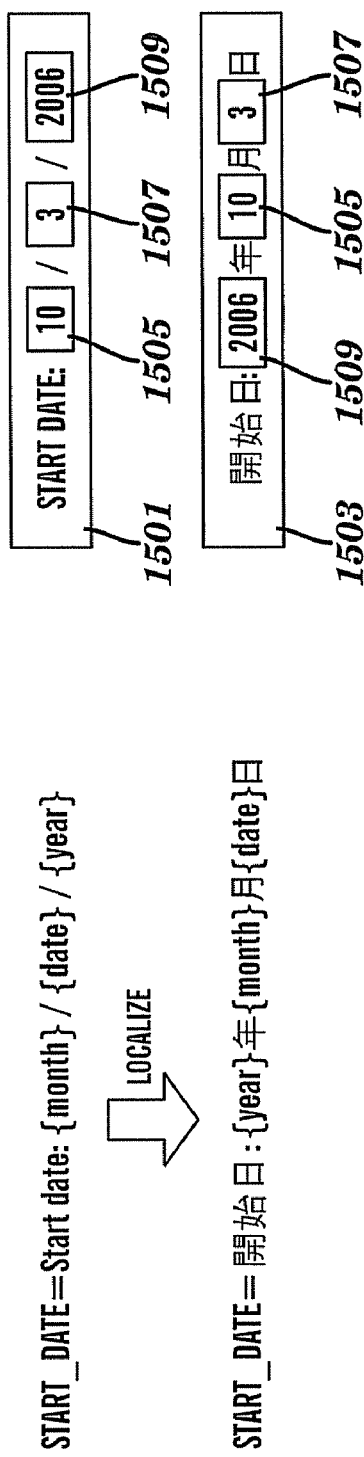
FIG. 15 illustrates a UI in the form of an I18N element providing multiple controls.

FIG. 15 illustrates an I18N element providing multiple controls. In the present example, these multiple controls include a first control in the form of a first input field 1505 for accepting a number representing a month, a second control in the form of a second input field 1507 representing a day of the month, and a third control in the form of a third input field 1509 representing a year. The first, second, and third input fields 1505, 1507, 1509 are arranged to provide an English language group of UI controls 1501 and a Japanese language group of UI controls 1503. Using the procedures described in any of FIGS. 8, 9, 10A and 10, the English language group of UI controls 1501 (FIG. 15) and the Japanese language group of UI controls 1503 provide internationalization elements such as date, time, currency, or address through multiple input controls. A locale specific UI layout (i.e., the English language group of UI controls 1501 and the Japanese language group of UI controls 1503) can be separated from program logic for a user application, and the locale specific layout can be passed to a translation process as one or more translatable resources.

Figure 16:
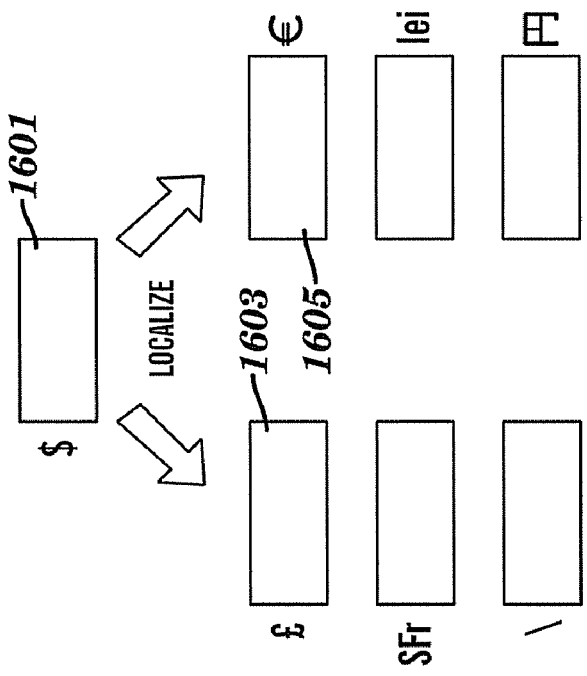
FIG. 16 illustrates a UI in the form of an I18N element providing multiple controls for currency.

FIG. 16 illustrates an example of an I18N element providing multiple controls for currency. A first input field 1601 accepts a numeric entry representing a monetary amount in dollars, a second input field 1603 accepts a numeric entry representing a monetary amount in British Pounds Sterling, and a third input field 1605 represents a monetary amount in Euros.

Figure 17:
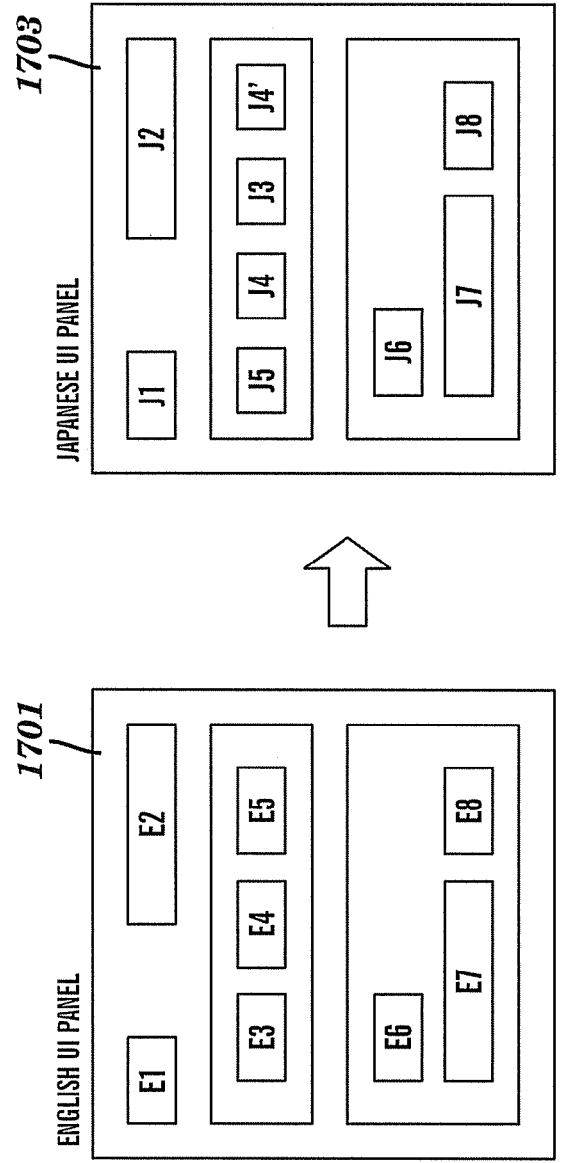
FIG. 17 illustrates an English UI panel and a corresponding Japanese UI panel.

FIG. 17 illustrates an English UI panel 1701 and a corresponding Japanese UI panel 1703. The English UI panel 1701 includes a number of UI controls in a UI control layout. The UI controls include E1, E2, E3, E4, E5, E6, E7, and E8. These controls may comprise input fields, text labels, or both. The Japanese UI panel 1703 includes a number of UI controls in a UI control layout. The UI controls include J1, J2, J5, J4, J3, J4', J6, J7, and J8. These controls may comprise input fields, text labels, or both. Prior art methods enable each of these controls to be used in a plurality of target regions, or in conjunction with a plurality of target languages, by utilizing a one-to-one correspondence between the controls. For example, E1 is used to set J1, E2 is used to set J2, and so on. Depending upon the languages in question, this may result in an incorrect translation. However, the methods described with respect to FIGS. 8, 9, 10A and 10B provide an enhanced UI wherein at least one of the sequence or number of controls is changed according to a target region or target language. For example, E3, E4, and E5 are changed to J5, J4, J3, J4'.

Figure 18:
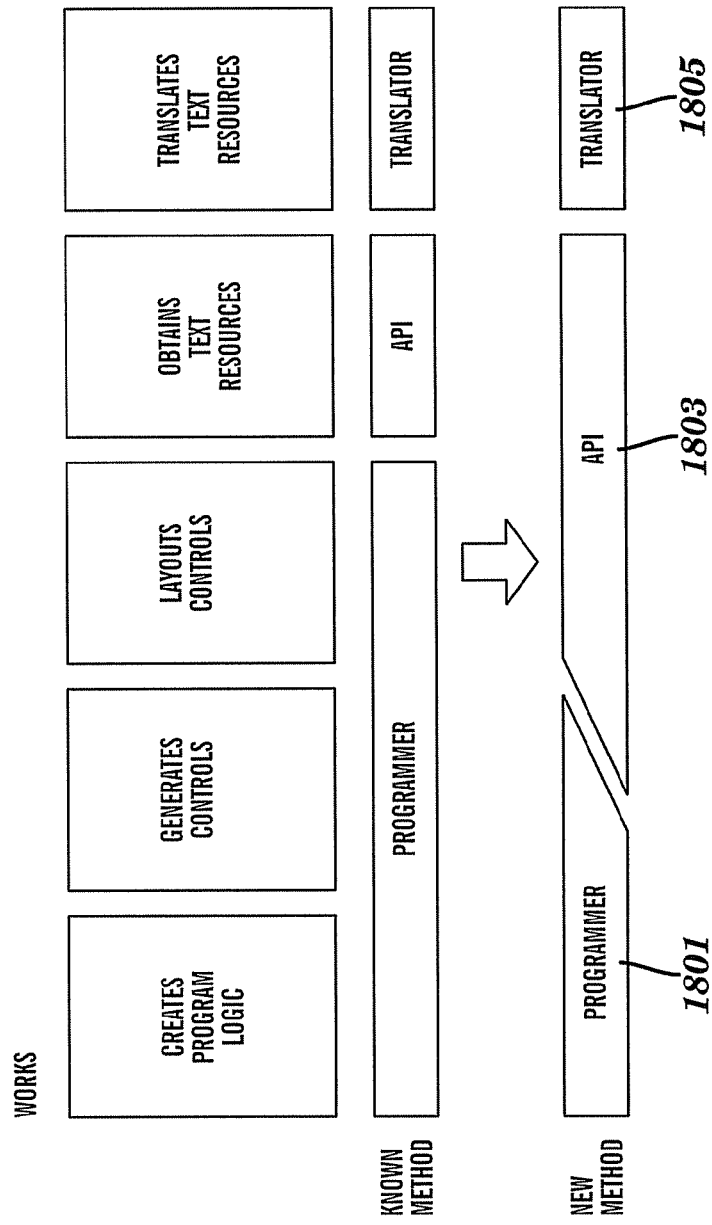
FIG. 18 is a diagrammatic representation showing allocation of tasks among a programmer, an application program interface (API), and a translator.
Figure 20:
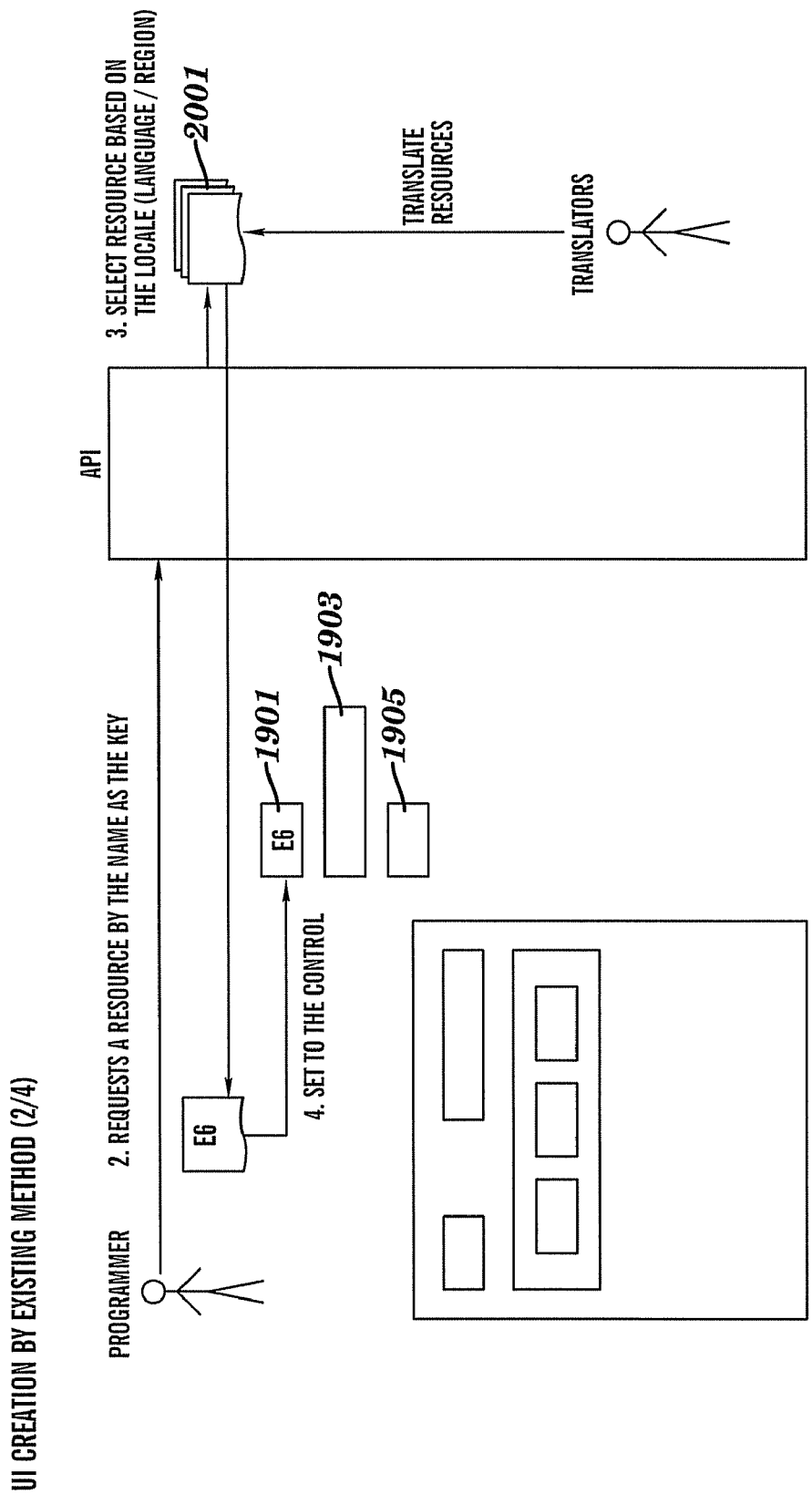

FIG. 18 is a diagrammatic representation showing allocation of tasks among a programmer 1801, an application program interface (API) 1803, and a translator 1805. In the case of prior art methods for generating UI's for use in a plurality of regions, or for use with a plurality of different languages, the programmer 1801 creates program logic, generates controls, and provides a control layout. The API 1803 obtains text resources, and the translator 1805 translates text resources. The translator 1805 could be implemented using a software-implemented translation process or a human translator or both. The methods of FIGS. 8, 9, 10A and 10B may be performed such that the programmer 1801 creates program logic. The task of generating controls is shared by the programmer 1801 and the API 1803. The API 1803 lays out the controls and obtains text resources. The translation of text resources is performed by the translator 1805.

Figure 21:
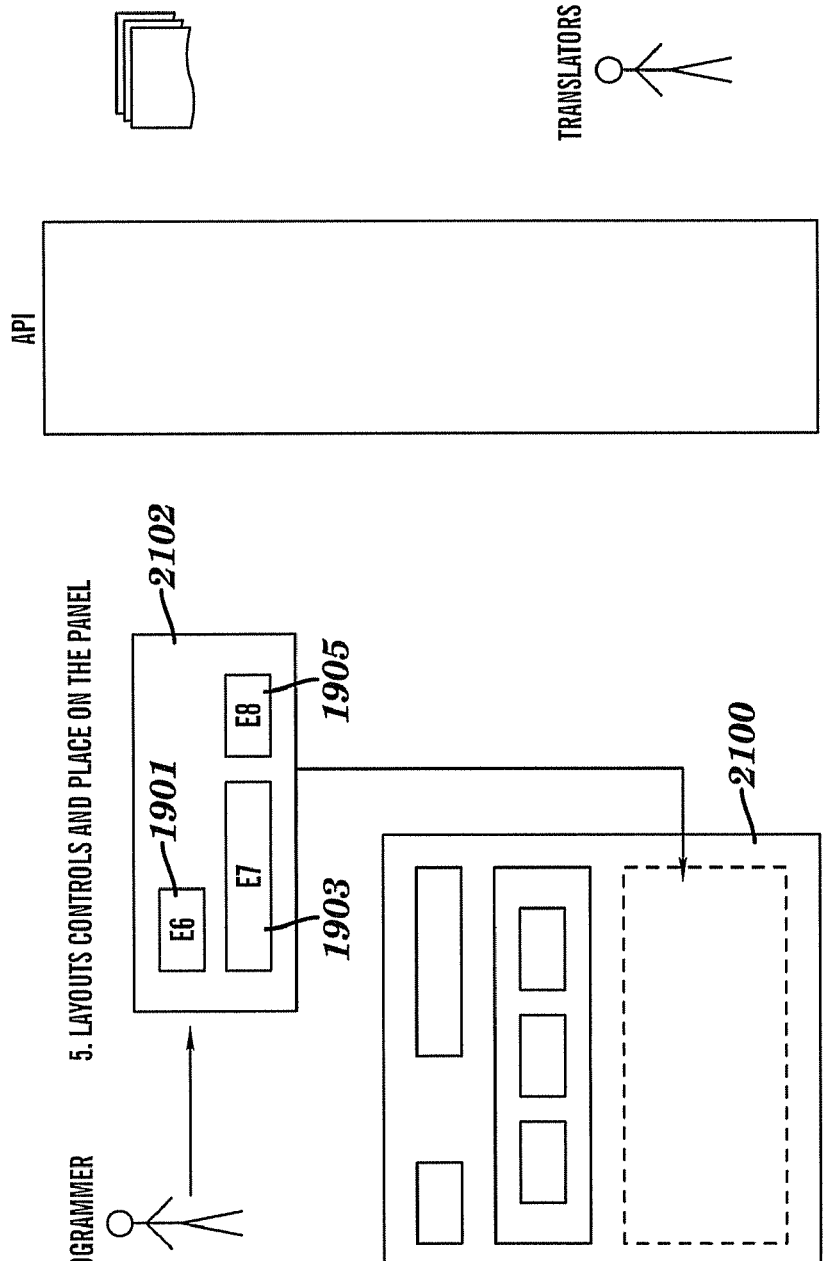
Figure 22:
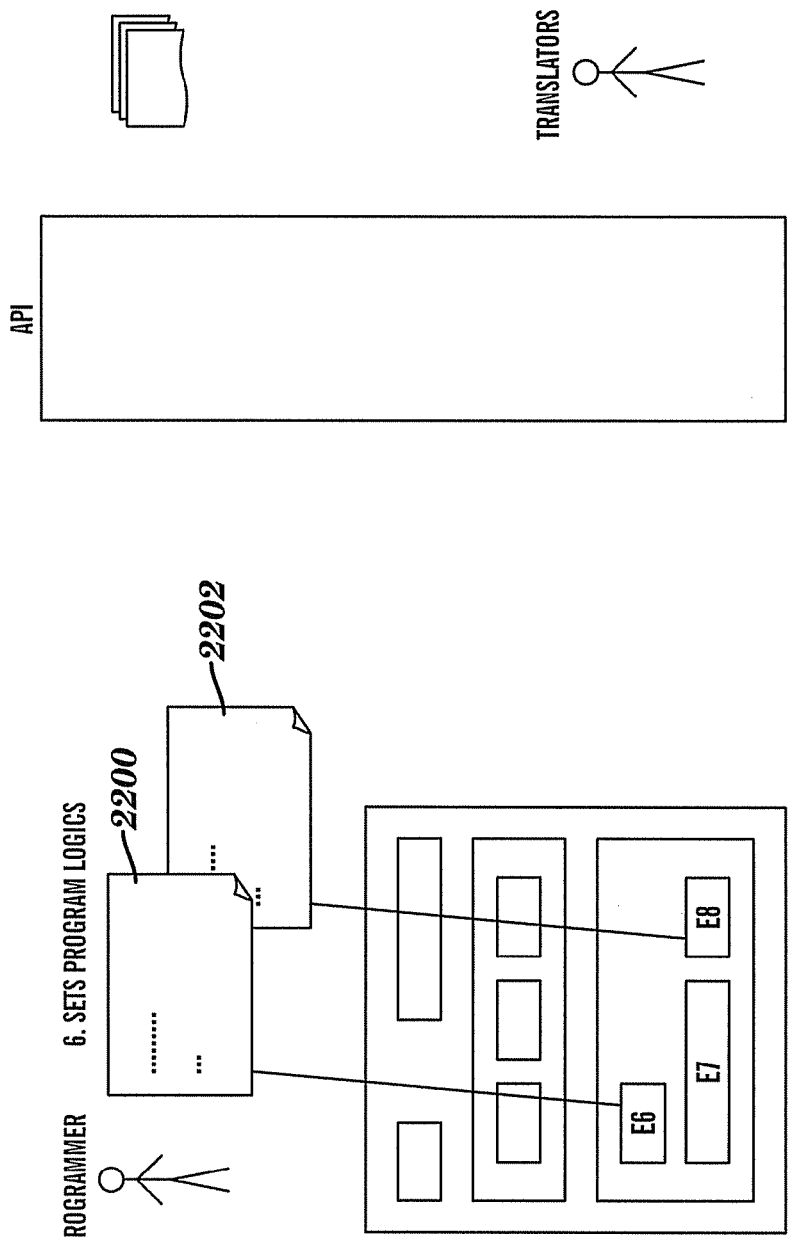

FIGS. 19-22 together comprise a sequential data flow diagram illustrating a prior art method for generating a UI. With reference to FIG. 19, a programmer creates a plurality of controls such as a first control 1901, a second control 1903, and a third control 1905. Next, with reference to FIG. 20, the programmer requests a resource using a name of the resource as a key. The request is received by an API which selects a resource 2001 based upon language or geographic region. The selected resource, in this example E6, is set to the first control 1901. Referring now to FIG. 21, the programmer lays out the controls 1901, 1903, 1905 and places the controls on a panel 2102 of a UI 2100. The first control 1901 is set to E6, the second control 1903 is set to E7, and the third control 1905 is set to E8. Then, with reference to FIG. 22, the programmer sets a first program logic 2200 for E6. A second program logic 2202 is set for E8.

Figure 23:
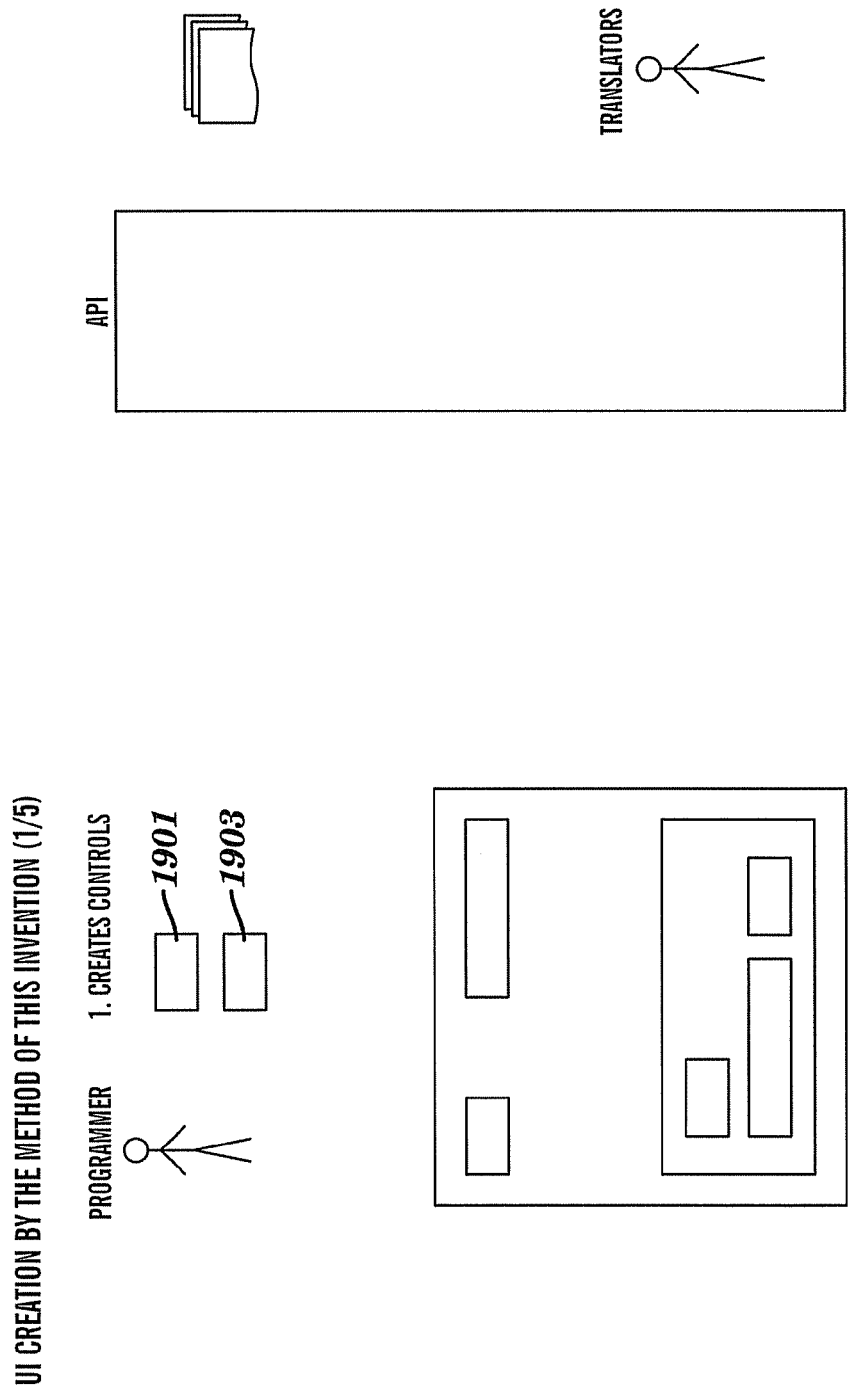
FIGS. 23-27 together comprise a sequential data flow diagram illustrating generation of a UI in accordance with the methods described herein.
Figure 24:
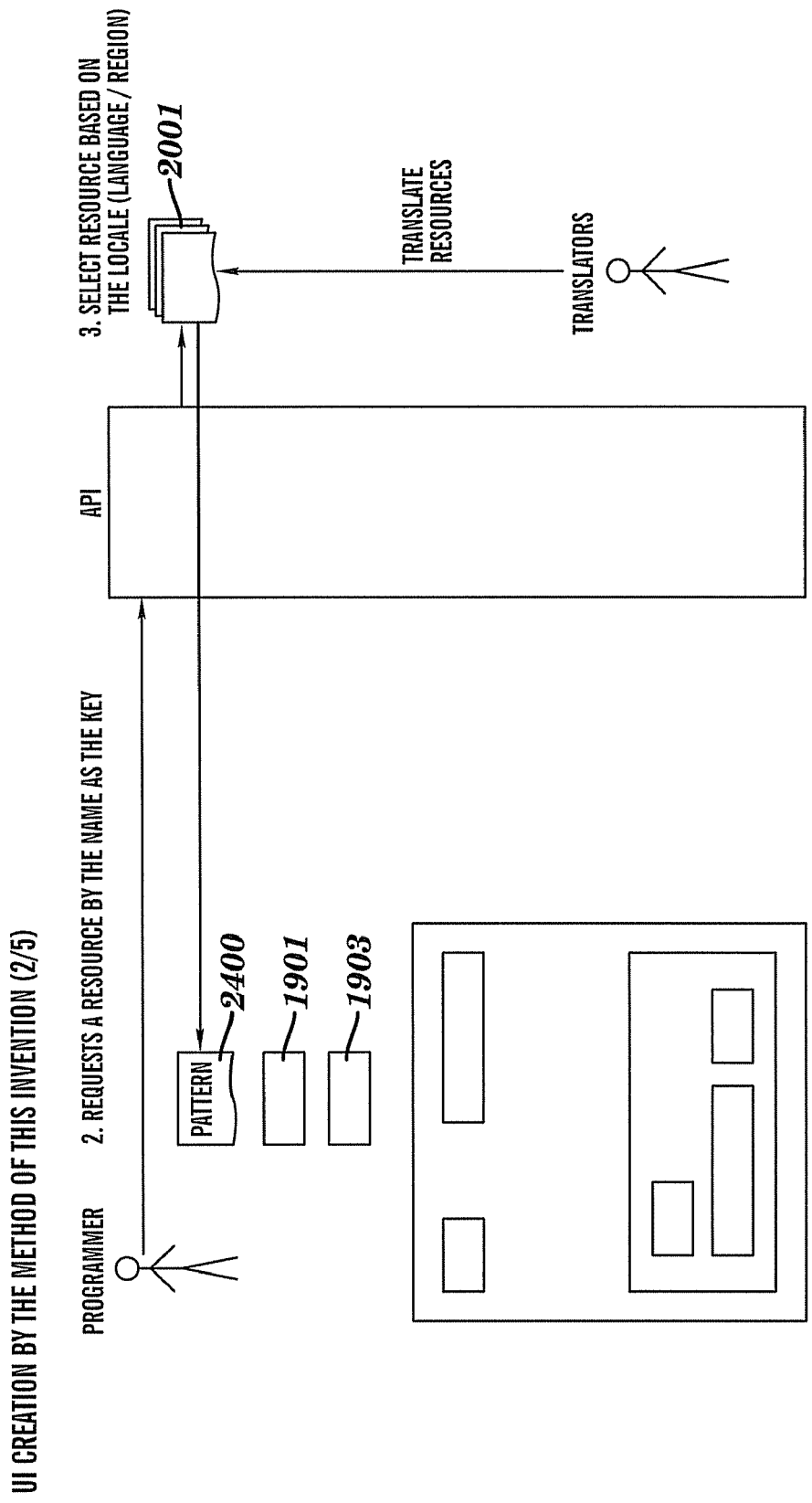
Figure 25:
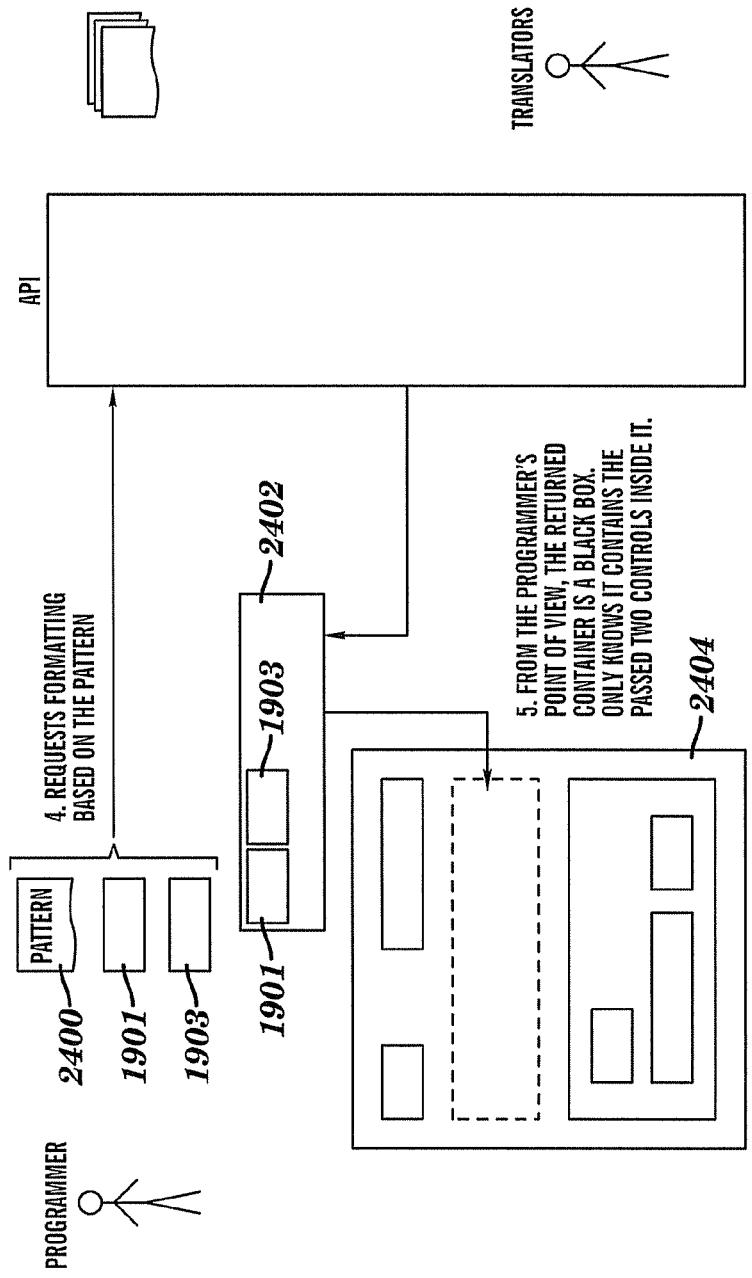

FIGS. 23-27 together comprise a sequential data flow diagram illustrating generation of a UI in accordance with the methods described herein. With reference to FIG. 23, a programmer creates a plurality of controls such as a first control 1901 and a second control 1903. Next, with reference to FIG. 24, the programmer requests a resource using a name of the resource as a key. The request is received by an API which selects a resource 2001 based upon language or geographic region. The API then uses the selected resource 2001 to obtain a pattern 2400. Referring now to FIG. 25, the API receives a request for formatting based upon the pattern 2400, first control 1901 and second control 1903. In response to the formatting request, the API generates a returned container 2402. From the point of a programmer, the returned container 2402 may be conceptualized as a black box that contains two passed controls 1901, 1903.

Figure 26:
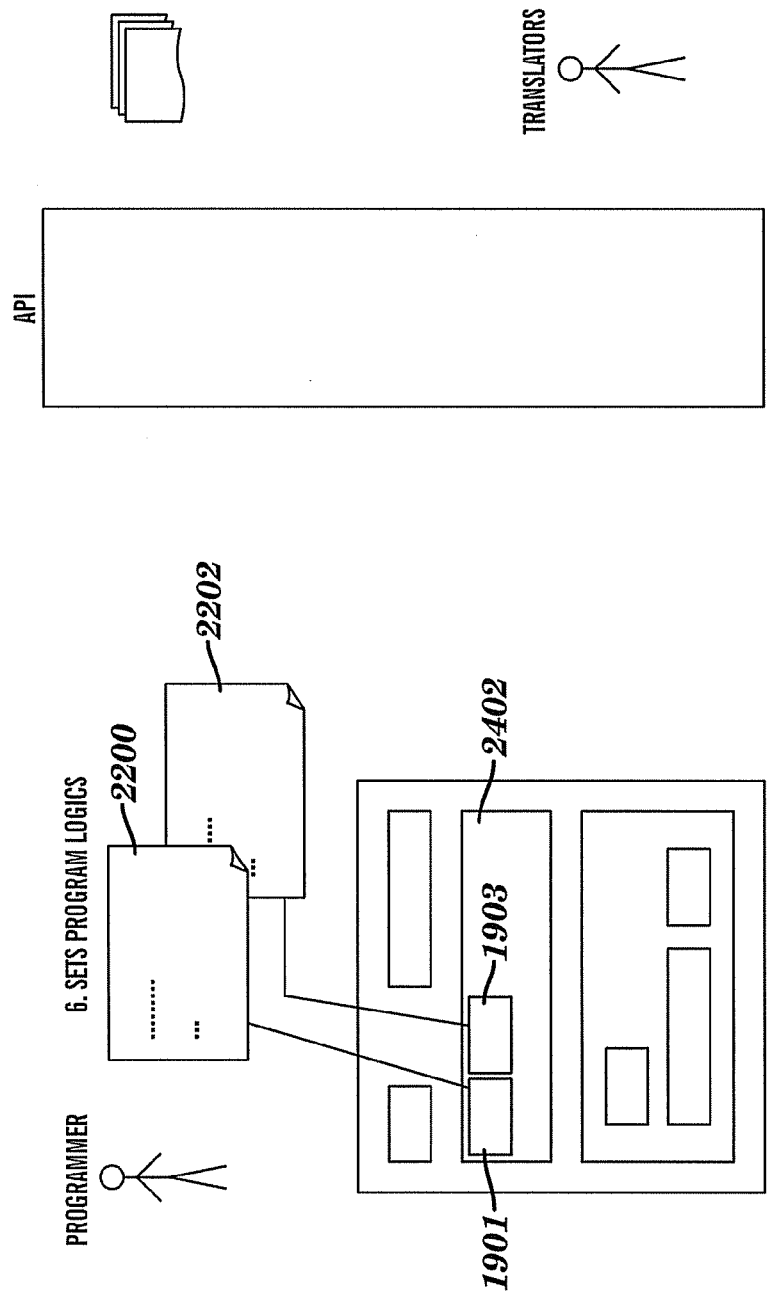
Figure 27:
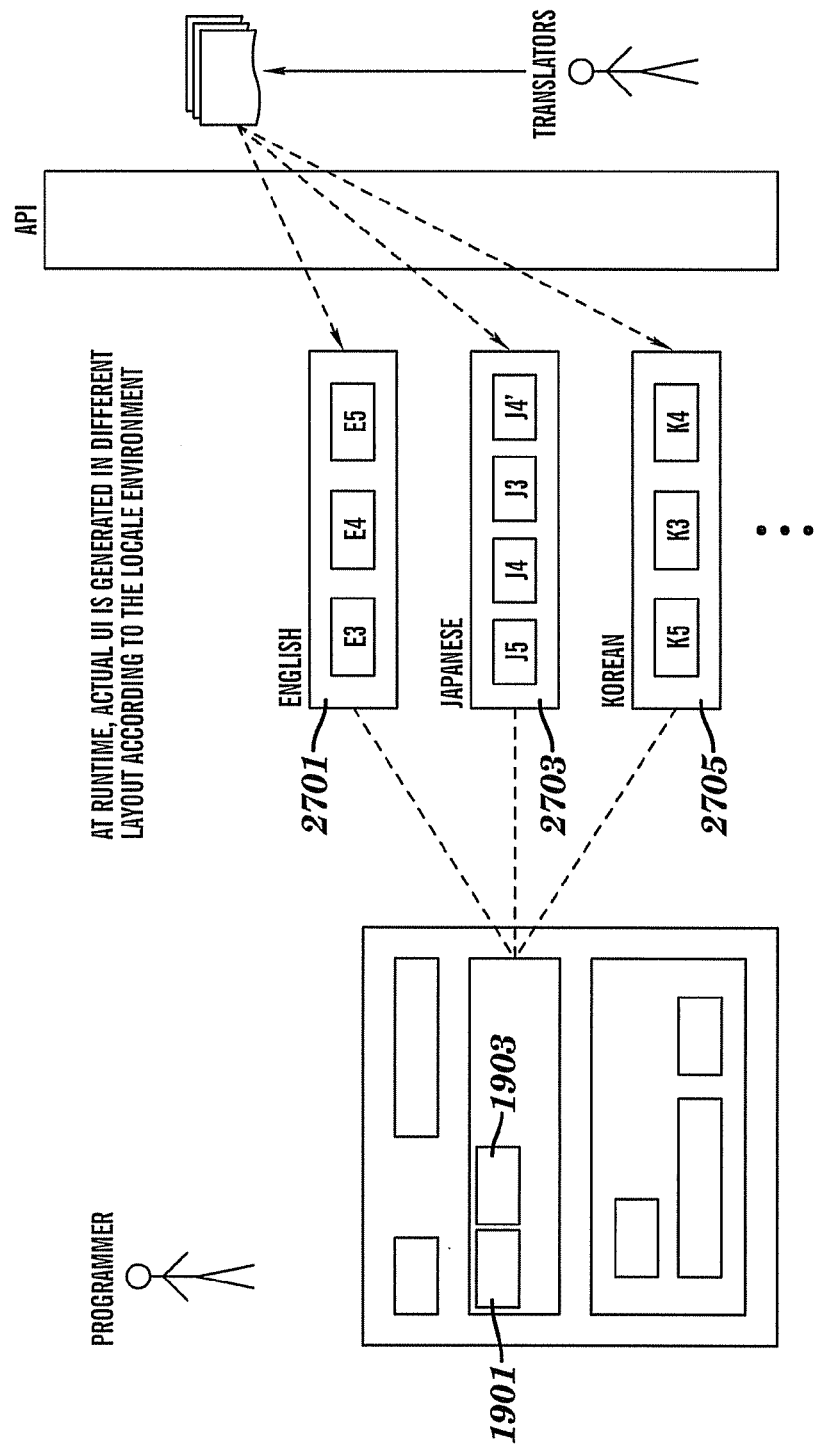

With respect to FIG. 26, a first program logic 2200 is set for the first control 1901, and a second program logic 2202 is set for the second control 2202. Referring to FIG. 27, at runtime when a user application is executed, an actual UI is generated based upon a current language environment or a current geographic locale. For example, container 2402 (FIG. 26) may be used to generate an English language UI 2701 (FIG. 27), or a Japanese language UI 2703, or a Korean language UI 2705, at runtime. The English language UI 2701 includes a first control E3, a second control E4, and a third control E5. The Japanese language UI 2703 includes a first control J5, a second control J4, a third control J3, and a fourth control J4'. The Korean language UI 2705 includes a first control K5, a second control K3, and a third control K4.

Figure 28:
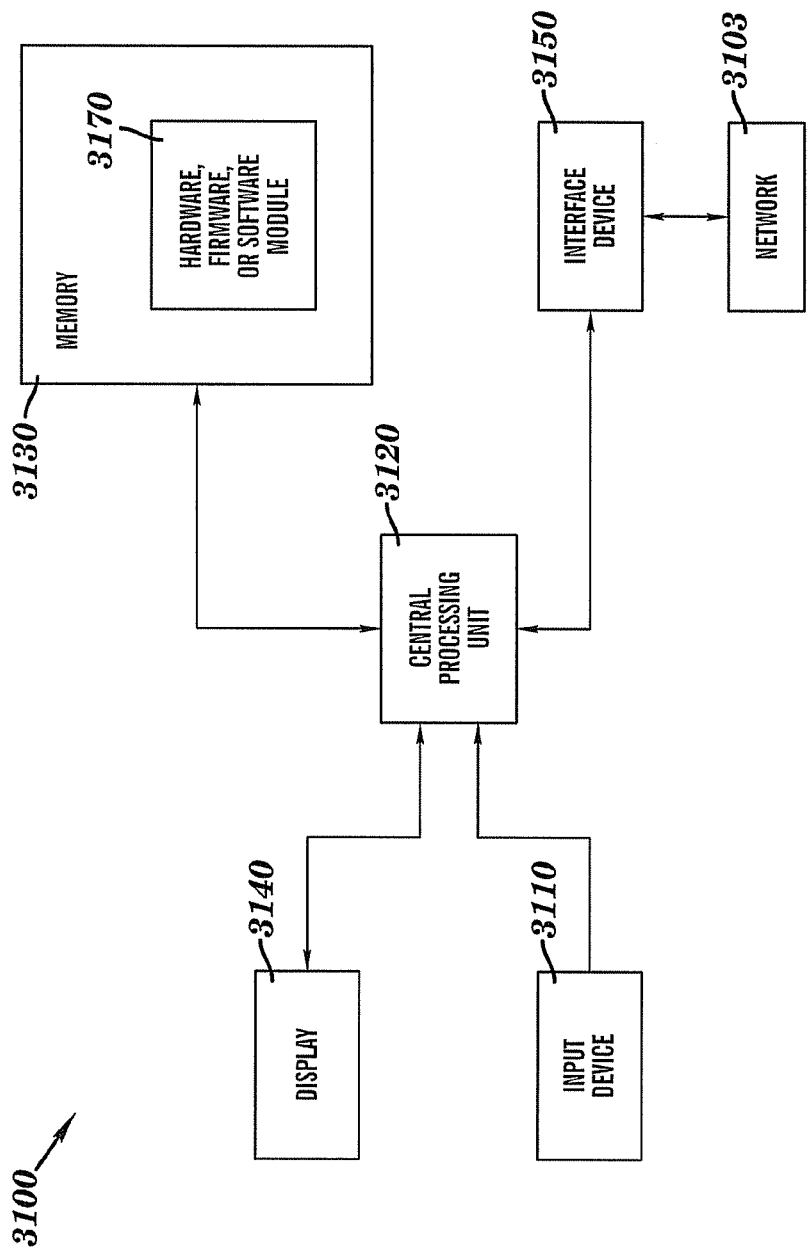
FIG. 28 is a block diagram illustrating an exemplary system on which any of the methods of the present invention may be performed.

FIG. 28 is a block diagram illustrating an exemplary system on which any of the methods of the present invention may be performed. It is to be clearly understood that FIG. 28 is illustrative in nature, as other systems, devices, or apparatuses not shown in FIG. 28 may also be used to implement embodiments of the invention. The data processing system 3100 includes an input device 3110, a central processing unit ("CPU") 3120, memory 3130, a display 3140, and an interface device 3150. The input device 3110 may include a keyboard, a mouse, a trackball, or a similar device. The CPU 3120 may include dedicated coprocessors and memory devices. The memory 3130 may include RAM, ROM, databases, or disk devices. The display 3140 may include a computer screen, terminal device, a hardcopy producing output device such as a printer or plotter, or a similar device. The interface device 3150 may include a connection or interface to a network 3103 such as the Internet, an intranet, a local area network (LAN), or a wide area network (WAN).

Optionally, the data processing system 3100 may be linked to other data processing systems over the network 3103. These other data processing systems may, but need not, include an application for developing one or more user interfaces (UIs) to provide internationalization of a user application. Of course, the data processing system 3100 may contain additional software and hardware, a description of which is not necessary for understanding the invention.

The data processing system 3100 has stored therein data representing sequences of instructions which, when executed, cause the methods described hereinafter to be performed. Thus, the data processing system 3100 includes computer executable programmed instructions for directing the system 3100 to implement any of the embodiments of the present invention. The programmed instructions may be embodied in at least one hardware, firmware, or software module 3170 resident in the memory 3130 of the data processing system 3100. Alternatively or additionally, the programmed instructions may be embodied on a computer readable medium (such as a CD disk or floppy disk) which may be used for transporting the programmed instructions to the memory 3130 of the data processing system 3100. Alternatively or additionally, the programmed instructions may be embedded in a computer-readable, signal or signal-bearing medium that is uploaded to the network 3103 by a vendor or supplier of the programmed instructions, and this signal or signal-bearing medium may be downloaded through an interface 3150 to the data processing system 3100 from the network 3103 by end users or potential buyers.

The capabilities of the present invention can be implemented in software, firmware, hardware or some combination thereof. As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While various preferred embodiments of the invention have been described, it will be understood that those skilled in the art, both now and in the future, may make various improvements and enhancements which fall within the scope of the claims which follow. These claims should be construed to maintain the proper protection for the inventions described herein.

What is claimed is:

1. A method executed by a processor of internationalizing a user interface (UI) control layout for a user application, the method comprising:
    extracting a translatable text resource comprising a pattern of a message for performing the UI control layout from a source code of the application;
    receiving language information that is indicative of one or more languages for the UI control layout;
    based upon the received language information, constructing the pattern;
    dynamically laying out the pattern at run time for graphical presentation to one or more users, wherein the graphical presentation is used to implement the UI control layout in accordance with the one or more languages;
    wherein the dynamically laying out the pattern at run time is performed such that a designated position for the implemented UI control layout automatically changes correctly in the graphical representation according to a respective grammatical structure for each of one of a plurality of corresponding target languages; and
    wherein the pattern of the message for performing the UI control layout comprises an input field and a corresponding text label, wherein the dynamically laying out the pattern at run time comprises positioning the input field and corresponding text label according to a respective grammatical structure for each of one of a plurality of corresponding target languages.

2. The method of claim 1 wherein extracting the translatable text resource, receiving the language information, constructing the pattern, and dynamically laying out the pattern are performed by utilizing an API for generating a plurality of static text labels on the basis of a pattern of a message and dynamically laying out the labels in combination with one or more UI controls of a user application.

3. The method of claim 2, the method further comprising:
    separating the character string from a source code for the user application, wherein the character string is to be delivered to a translation process;
    obtaining a pattern according to a language environment by using the API;
    preparing and delivering an instance of UI controls forming elements to the API together with the pattern;
    the API returning a container object containing the plurality of UI controls laid out according to the pattern;
    placing the returned object on the UI control layout;
    translating a resource which is the separated pattern character string into each of one or more languages;
    obtaining a translated pattern according to a language environment at a time that the user application is executed;
    dynamically determining the UI control layout according to the translated resource; and
    placing the UI control layout, comprising the array of the plurality of UI controls, on a screen for display on a graphical user interface, wherein the plurality of UI controls form the message according to the language at a run time of the user application.

4. The method of claim 3 wherein translating the resource is performed such that one or more designated positions for embedding elements may be changed freely in the message according to a grammatical structure for each of the one or more languages.

5. The method of claim 1 wherein extracting the translatable text resource, receiving the language information, constructing the pattern, and dynamically laying out the pattern are performed by utilizing an API for generating a plurality of static text labels on the basis of a pattern and returning a container object, wherein the container object includes contents laid out according to the static text labels and a runtime library for the API.

6. The method of claim 5, the method further comprising:
separating the character string from a source code for the user application, wherein the character string is to be to be delivered to a translation process
obtaining a pattern according to a language environment by using a standard resource API;
preparing and delivering an instance of UI controls forming elements to the standard resource API together with the pattern;
the standard resource API returning a container object containing one or a plurality of text labels and the delivered instance of UI controls;
placing the returned container object on the UI control layout;
sending a separated message comprising the separated character string to a translation process for translating the message into one or more different target languages;
obtaining a translated message from the translation process in accordance with a language environment determined at a time that the user application is executed;
dynamically determining the UI control layout according to the translated message;
placing the UI control layout, comprising the array of the plurality of UI controls, on a screen for display in a graphical user interface, wherein the plurality of UI controls form the message according to the language at a run time of the user application.

7. The method of claim 6 wherein the translation process is performed such that a designated position for one or more embedding elements of the UI control layout may be changed freely in the message according to a respective grammatical structure for each of one or more corresponding target languages.

8. A computer program product for internationalizing a user interface (UI) control layout for a user application, the computer program product comprising a storage medium readable by a processing circuit and storing instructions for execution by the processing circuit for facilitating a method comprising:
extracting a translatable text resource comprising a pattern of a message for performing the UI control layout from a source code of the application;
receiving language information that is indicative of one or more languages for the UI control layout;
based upon the received language information, constructing the pattern;
dynamically laying out the pattern at run time for graphical presentation to one or more users, wherein the graphical presentation is used to implement the UI control layout in accordance with the one or more languages; and
wherein the dynamically laying out the pattern at run time is performed such that a designated position for the implemented UI control layout automatically changes correctly in the graphical representation according to a respective grammatical structure for each of one of a plurality of corresponding target languages; and
wherein the message for performing the UI control layout comprises a pattern for embedding an array of a plurality of UI controls.

9. The computer program product of claim 8 wherein extracting the translatable text resource, receiving the language information, constructing the pattern, and dynamically laying out the pattern are performed by utilizing an API for generating a plurality of static text labels on the basis of a pattern of a message and dynamically laying out the labels in combination with one or more UI controls of a user application.

10. The computer program product of claim 9, the method further comprising:
separating the character string from a source code for the user application, wherein the character string is to be delivered to a translation process;
obtaining a pattern according to a language environment by using the API;
preparing and delivering an instance of UI controls forming elements to the API together with the pattern;
the API returning a container object containing the plurality of UI controls laid out according to the pattern;
placing the returned object on the UI control layout;
translating a resource which is the separated pattern character string into each of one or more languages;
obtaining a translated pattern according to a language environment at a time that the user application is executed;
dynamically determining the UI control layout according to the translated resource; and
placing the UI control layout, comprising the array of the plurality of UI controls, on a screen for display on a graphical user interface, wherein the plurality of UI controls form the message according to the language at a run time of the user application.

11. The computer program product of claim 10 wherein translating the resource is performed such that one or more designated positions for embedding elements may be changed freely in the message according to a grammatical structure for each of the one or more languages.

12. The computer program product of claim 8 wherein extracting the translatable text resource, receiving the language information, constructing the pattern, and dynamically laying out the pattern are performed by utilizing an API for generating a plurality of static text labels on the basis of a pattern and returning a container object, wherein the container object includes contents laid out according to the static text labels and a runtime library for the API.

13. The computer program product of claim 12, the method further comprising:
separating the character string from a source code for the user application, wherein the character string is to be to be delivered to a translation process
obtaining a pattern according to a language environment by using a standard resource API;
preparing and delivering an instance of UI controls forming elements to the standard resource API together with the pattern;
the standard resource API returning a container object containing one or a plurality of text labels and the delivered instance of UI controls;
placing the returned container object on the UI control layout;
sending a separated message comprising the separated character string to a translation process for translating the message into one or more different target languages;
obtaining a translated message from the translation process in accordance with a language environment determined at a time that the user application is executed;
dynamically determining the UI control layout according to the translated message;

placing the UI control layout, comprising the array of the plurality of UI controls, on a screen for display in a graphical user interface, wherein the plurality of UI controls form the message according to the language at a run time of the user application.

14. The computer program product of claim 13 wherein the translation process is performed such that a designated position for one or more embedding elements of the UI control layout may be changed freely in the message according to a respective grammatical structure for each of one or more corresponding target languages.

15. A system including a computer memory storing instructions for internationalizing a user interface (UI) control layout for a user application, the system comprising:
   a processing mechanism for extracting a translatable text resource comprising a pattern of a message for performing the UI control layout from a source code of the application;
   a receiving mechanism, operatively coupled to the processing mechanism, for receiving language information that is indicative of one or more languages for the UI control layout;
   wherein, based upon the received language information, the processing mechanism constructs the pattern and dynamically lays out the pattern at run time for graphical presentation to one or more users;
   wherein the graphical presentation is used to implement the UI control layout in accordance with the one or more languages; and
   wherein dynamically laying out the pattern at run time is performed such that a designated position for the implemented UI control layout automatically changes correctly in the graphical representation according to a respective grammatical structure for each of one of a plurality of corresponding target languages; and
   wherein the message for performing the UI control layout comprises a pattern for embedding an array of a plurality of UI controls.

16. The system of claim 15 wherein the processing mechanism utilizes an API for generating a plurality of static text labels on the basis of a pattern of a message and dynamically laying out the labels in combination with one or more UI controls of a user application.

17. The system of claim 16, the processing mechanism being programmed to perform:
   separating the character string from a source code for the user application, wherein the character string is to be delivered to a translation process;
   obtaining a pattern according to a language environment by using the API;
preparing and delivering an instance of UI controls forming elements to the API together with the pattern;
   the API returning a container object containing the plurality of UI controls laid out according to the pattern;
   placing the returned object on the UI control layout;
   translating a resource which is the separated pattern character string into each of one or more languages;
   obtaining a translated pattern according to a language environment at a time that the user application is executed;
   dynamically determining the UI control layout according to the translated resource; and
   placing the UI control layout, comprising the array of the plurality of UI controls, on a screen for display on a graphical user interface, wherein the plurality of UI controls form the message according to the language at a run time of the user application.

18. The system of claim 17 wherein translating the resource is performed such that the processing mechanism is capable of changing one or more designated positions for embedding elements in the message according to a grammatical structure for each of the one or more languages.

19. The system of claim 15 wherein the processing mechanism utilizes an API for generating a plurality of static text labels on the basis of a pattern and returning a container object, wherein the container object includes contents laid out according to the static text labels and a runtime library for the API.

20. The system of claim 19, the processing mechanism being programmed to perform:
   separating the character string from a source code for the user application, wherein the character string is to be to be delivered to a translation process
   obtaining a pattern according to a language environment by using a standard resource API;
   preparing and delivering an instance of UI controls forming elements to the standard resource API together with the pattern;
   the standard resource API returning a container object containing one or a plurality of text labels and the delivered instance of UI controls;
   placing the returned container object on the UI control layout;
   sending a separated message comprising the separated character string to a translation process for translating the message into one or more different target languages;
   obtaining a translated message from the translation process in accordance with a language environment determined at a time that the user application is executed;
   dynamically determining the UI control layout according to the translated message;
   placing the UI control layout, comprising the array of the plurality of UI controls, on a screen for display in a graphical user interface, wherein the plurality of UI controls form the message according to the language at a run time of the user application; and
   wherein placing the UI control layout is performed such that a designated position for the implemented UI control layout automatically changes correctly in the graphical representation according to a respective grammatical structure for each of one of a plurality of corresponding target languages.

21. The system of claim 20 wherein the translation process is performed such that the processing mechanism is capable of changing a designated position for one or more embedding elements of the UI control layout in the message according to a respective grammatical structure for each of one or more corresponding target languages.

* * * * *